United States Patent
Cherpantier et al.

(10) Patent No.: US 7,921,322 B2
(45) Date of Patent: Apr. 5, 2011

(54) OPTIMIZE PERSONALIZATION CONDITIONS FOR ELECTRONIC DEVICE TRANSMISSION RATES WITH INCREASED TRANSMITTING FREQUENCY

(75) Inventors: Fredric Cherpantier, Rueil Malmaison (FR); Nicolas Prawitz, Gif sur Yvette (FR)

(73) Assignee: Spansion LLC, Sunnyvale, CA (US)

( * ) Notice: Subject to any disclaimer, the term of this patent is extended or adjusted under 35 U.S.C. 154(b) by 714 days.

(21) Appl. No.: 11/874,001

(22) Filed: Oct. 17, 2007

(65) Prior Publication Data

US 2009/0106577 A1  Apr. 23, 2009

(51) Int. Cl.
  *G06F 1/04* (2006.01)
(52) U.S. Cl. .......... 713/600; 713/500; 713/501
(58) Field of Classification Search .......... 713/322, 713/500, 501, 600; 711/167; 710/11, 14, 710/58, 60

See application file for complete search history.

(56) References Cited

U.S. PATENT DOCUMENTS

| | | | |
|---|---|---|---|
| 2004/0215996 A1* | 10/2004 | Kanamori et al. | 713/600 |
| 2005/0182881 A1* | 8/2005 | Chou et al. | 710/301 |
| 2006/0103741 A1* | 5/2006 | Ogawa | 348/231.99 |
| 2007/0247934 A1* | 10/2007 | Kagan | 365/193 |

* cited by examiner

*Primary Examiner* — Mark Connolly
*Assistant Examiner* — Paul B Yanchus, III
(74) *Attorney, Agent, or Firm* — Turocy & Watson, LLP

(57) ABSTRACT

Systems and/or methods that facilitate expediently transmitting and programming data to an electronic device that contains nonvolatile memory are presented. A host component facilitates the determination of different clock frequencies that an electronic device(s) can accommodate for transmitting data to and receiving data from the electronic device. The host component can facilitate transmitting data to the electronic device at a higher clock frequency than the clock frequency utilized to transmit data from the electronic device to the host component in order to facilitate programming large amounts of data to the electronic device efficiently. The host component can select a downlink and/or uplink clock frequency based in part on the type of electronic device(s), the size of a memory buffer associated with the nonvolatile memory device, and/or a type of protocol associated with the electronic device.

20 Claims, 15 Drawing Sheets

OPTIMIZE PERSONALIZATION CONDITIONS FOR ELECTRONIC DEVICE TRANSMISSION RATES WITH INCREASED TRANSMITTING FREQUENCY

TECHNICAL FIELD

The present invention relates generally to memory systems and in particular, to systems and/or methodologies that can facilitate expedient transmission of data to memory devices.

BACKGROUND

Many miniaturized electronic devices, such as cellular phones, smart cards, personal digital assistants (PDAs), electronic games, and/or electronic organizers have built-in memory associated with the devices. In the past, the amount of memory associated with the electronic devices has been relatively small. However, the amount of memory associated with these electronic devices has steadily increased.

In particular, flash memory can be employed in these types of electronic devices. Flash memory is a type of electronic memory media that can be rewritten and can retain content without consumption of power. Flash memory has become popular, at least in part, because it combines the advantages of the high density and low cost of erasable programmable read only memory (EPROM) with the electrical erasability of electronically erasable programmable read only memory (EEPROM). Flash memory is non-volatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten as well as its retention of data without a power source, small size and light weight have all combined to make flash memory devices useful and popular means for transporting and maintaining data.

Typically, programming data to the memory contained in the electronic devices has been performed using a serial interface associated with an external source such as a card reader or host computer. The external source can also provide the power associated with the programming operation to the electronic device. Conventionally, the transmit and receive clock used for transferring the data over the serial link has operated at the same frequency such that data programmed to the electronic device is transmitted at the same speed as data read from the electronic device.

However, with the advent of smaller memory that can be fabricated on the electronic devices and the relative low cost of the memory, the size of the memory associated with the electronic devices have grown substantially. As a result, the amount of information that can be stored in such electronic devices has grown, and there is an ever increasing demand for storing greater amounts of information in electronic devices, such as portable electronic devices (e.g., smart card, cellular phone, etc.). Based on a given clock rate, as the amount of data to be programmed increases, the amount time to accomplish such programming operation can also increase. While the amount of data programmed to memory in electronic devices can be a relatively large amount, the amount of data typically read from the memory is relatively small.

It is desirable to be able to transmit and program data to the memory of an electronic device at increased speeds as this can result in higher productivity and/or lower manufacturing cost due in part to the decreased amount of programming time associated with programming data to memory in such electronic devices.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can facilitate expedient programming of data (e.g., applications, personal information, audio files, video files, operating systems (OSs), game programs, etc.) to memory in electronic devices (e.g., smart card, cellular phone, personal digital assistant (PDA), etc.). It is to be appreciated that the programming of the memory in an electronic device can occur while the electronic devices are installed in the associated end-user devices or while the electronic devices are being fabricated.

In accordance with one aspect of the disclosed subject matter, a host component can facilitate transmitting data to an electronic device(s) (e.g., programming data to a memory in the electronic device(s)) using a faster clock speed (e.g., higher clock frequency, hereinafter also referred as the "downlink clock" or "downlink clock frequency") than the clock frequency associated with an uplink to transmit data from the memory in the electronic device to the host component. The host component can receive data from the electronic device(s) using the slower clock frequency (e.g., a clock that operates at a lower clock frequency than that of the downlink clock) (also referred to hereinafter as "uplink clock" or "uplink clock frequency"). It is to be appreciated that the host component can facilitate transmitting data to an electronic device and/or facilitate receiving data from an electronic device with respect to a single electronic device or a plurality of electronic devices, wherein data can be transmitted from the host component to the plurality of electronic devices at the same or substantially same time, in accordance with an aspect of the disclosed subject matter.

Often the amount of data programmed to a memory in an electronic device can be significantly greater than the amount of data typically read from the memory in the electronic device. For example, with regard to a smart card, a significant amount of data (e.g., operating system, application, personalized information, etc.) can be programmed to the smart card; however, when information is retrieved from the smart card, often a relatively smaller amount of data is read from the memory in the smart card. By employing a faster clock frequency during a downlink operation (e.g., program operation), as compared to the clock frequency for the uplink operation (e.g., read operation), the host component can facilitate transmitting data to the electronic device at a faster rate than the transmission of data from the electronic device to the host component. As a result, the amount of time utilized to transmit data to the electronic device can be reduced as compared to the amount of time that would be utilized to transmit such data conventionally, where the uplink clock and the downlink clock have the same frequency. Further, by allowing the electronic device (e.g., smart card) to also operate at the uplink clock frequency, which can be based on a conventional communication protocol (e.g., the International Standards Organization (ISO) 7816-3 protocol), the electronic device can be utilized and can interface with other devices that employ such protocol.

In accordance with another aspect of the disclosed subject matter, the host component can facilitate querying the electronic device(s) to determine a frequency at which the downlink clock can be set to transmit and/or program data to the memory in the electronic device(s) (e.g., the maximum clock frequency at which data can be programmed to the memory in the electronic device). The host component can dynamically set the downlink clock to the frequency (e.g., the downlink clock) based in part on the response of the electronic device and/or associated memory to the query. In one aspect, the uplink clock can remain at a predetermined frequency that can be a known value (e.g., to a set standard or protocol such as, for example, the International Standards Organization (ISO) 7816-3). The uplink clock can be dynamically set, for example, to a frequency that can be lower than that of the downlink clock and can be a predetermined frequency that can be set at the time the electronic device is fabricated. During a program operation or other downlink operation, the host component can transmit the data using the downlink clock frequency. During a read operation or other uplink operation, where the data can be transmitted from the memory in the electronic device to the host component, the data can be transmitted to the host component using the established uplink clock frequency, which can be a clock frequency that is slower than the downlink clock frequency.

In accordance with another aspect of the disclosed subject matter, the host component can facilitate determining which downlink clock frequency, from a selection of up to n possible frequencies, can be used to transmit data to the memory(ies) of the electronic device(s). The host component can set the downlink clock to the selected frequency. The uplink clock can remain at a predetermined frequency that can be a predetermined value (e.g., via a set standard or protocol, for example) that can be lower than that of the downlink clock. During a program operation, where data can be transmitted from or via the host component to the memory of an electronic device, the host component can transmit the data using the downlink clock, which can be a higher frequency than the uplink clock. During a read operation or uplink operation, the data can be transmitted from the memory of the electronic device to the host component using the uplink clock.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
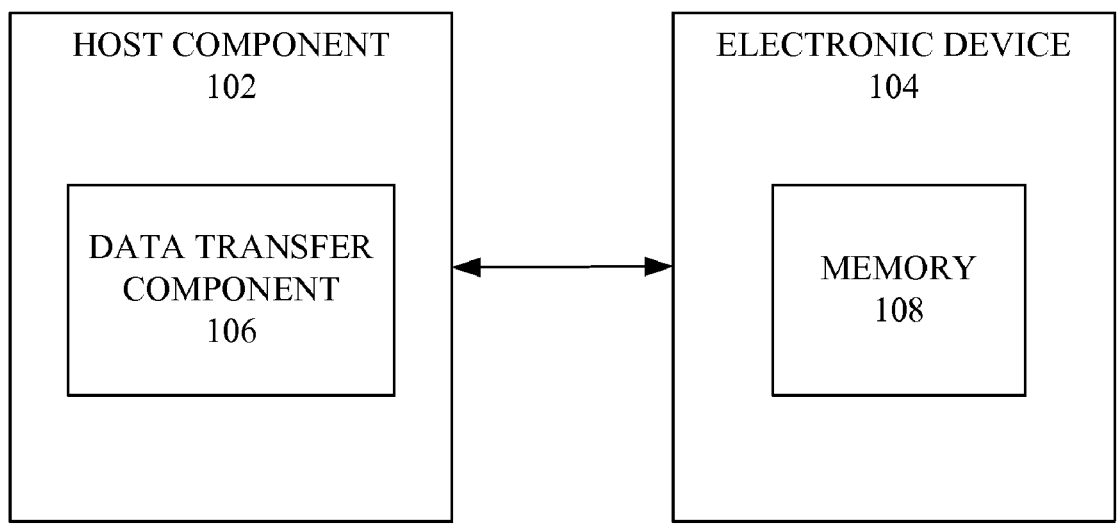
FIG. 1 illustrates a block diagram of a system that facilitates the transfer of data associated with an electronic device in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, the transmitting of data to and the receiving of data from an electronic device can occur at the same BAUD rate. However, it is desirable to improve the time at which it takes to transmit (e.g., program) data to electronic devices such as, for example, smart cards, cellular phones and the like, that can be fabricated with larger on-chip memory capacity, particularly where relatively large amounts of data are programmed to an electronic device. Typically, with certain electronic devices, such as smart cards, a relatively small amount of data is read or transmitted from such electronic device. As a result, an increase in transmission rate from the electronic device can yield relatively little benefit, particularly given the cost of implementation and potential impact on the limited space available on certain electronic devices (e.g., smart cards). Further, at the same time, it is desirable for such electronic devices to be able to communicate or interface with other electronic devices based on a standard protocol. In essence, it is desirable to effectively increase the transmit BAUD rate to the electronic device(s) while potentially maintaining a slower BAUD rate for receiving data from the electronic device(s).

Systems and methods that can facilitate the expedient transfer of data to an electronic device and/or to the plurality of the electronic devices are presented. A host component can be employed to facilitate transmitting data (e.g., downlink) to the electronic device(s) at a faster clock speed than data transmitted from the electronic device to the host component (or other component or device). The host component can include a data transfer component that can facilitate determining a desired clock frequency associated with transmitting data from the electronic device(s) to the host component and determining an optimal (e.g., fastest) clock frequency associated with transmitting data from the host component to the electronic device(s). It is to be appreciated that the associated clock frequency used for transmitting data to the electronic device(s) can be employed while the electronic device(s) is installed in the associated an end-user device(s) or while the electronic device(s) is being fabricated.

Turning to the figures, FIG. 1 illustrates a system 100 that can facilitate transmission of data associated with an electronic device in accordance with an aspect of the disclosed subject matter. System 100 can include a host component 102 that can facilitate transmitting data to and/or receiving data from an electronic device 104 (e.g., smart card, cellular phone, etc.). In accordance with one aspect, the host component 102 can be a universal asynchronous receiver/transmitter (UART) that can facilitate data transmissions between the host component 102 and the electronic device 104. It is to be appreciated that the subject innovation is not delimited, and the disclosed subject matter contemplates that more than one electronic device 104 can be programmed at the same time, or substantially the same time, in accordance with an aspect of the disclosed subject matter; however, for brevity, only one electronic device 104 is illustrated in system 100.

In accordance with an aspect of the disclosed subject matter, the host component 102 can be a card reader (e.g., smart card reader) that can transmit (e.g., program) or receive (e.g., read) data from a smart card (e.g., electronic device 104), a radio frequency identification (RFID) reader that can transmit and/or receive information from a card or other item that can be or can include an electronic device 104 that contains information, or other type of reader/writer that can communicate with an electronic device 104 (e.g., cellular phone, personal digital assistant (PDA), electronic game, etc.) to facilitate transmission of data between the host component 102 and the electronic device 104.

The electronic device(s) 104 can be comprised of least one memory 108, which can be a nonvolatile memory, for example. Nonvolatile memory can include, but is not limited to, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, and electrically erasable PROM (EEPROM). The memory 108 can include a memory array (not shown) comprised of a plurality of memory locations (e.g., memory cells) (not shown) wherein each memory location can store one or more bits of data. Data stored in the memory locations(s) can also be read and such data can be provided as an output.

The host component 102 can facilitate transmitting data to and receiving data from the electronic device 104. In accordance with one aspect, the host component 102 can interface with an electronic device 104 to electrically connect (e.g., wired or wireless) to the electronic device 104 and can facilitate transmitting data to the electronic device 104 at a different (e.g., faster) transmission rate than the rate at which data can be received from the electronic device 104 (hereinafter also referred to as "differential clocking rates"). It is to be appreciated that the host component 102 can facilitate transferring and receiving data at the differential clocking rates with respect to one electronic device 104 or to a plurality of the electronic devices 104. If the host component 102 is transferring data to a plurality of electronic devices 104, the host component 102 can facilitate transferring data at the same or substantially same time to the plurality of the electronic device(s) 104. It is further to be appreciated that the electronic device 104, and/or the plurality of electronic devices 104 thereof, each can be comprised of one or more of the memory 108.

In accordance with an aspect of the disclosed subject matter, the host component 102 can facilitate determining a clock frequency for transmitting data to the electronic device(s) 104. During a downlink data transmission, where data can be transmitted from the host component 102 to the electronic device 104, the host component 102 can interface with the electronic device such that the clock frequency generated by the host component 102 can be employed to control the transmission with the electronic device 104. That is, during a transmission, such clock frequency can be the clock signal employed with respect to certain components (e.g., an interface (not shown)) of the electronic device 104 such that the certain components can function based in part on such clock frequency. It is to be appreciated that the clock source (not shown) of the electronic device can still be utilized to provide clock functions for other components (e.g., memory 108) of the electronic device 104 during the transmission.

In accordance with an aspect, the host component 102 can include a data transfer component 106 that can facilitate the selection of a downlink clock frequency, which can be the clock frequency upon which the transmission rate for data transmitted from the host component 102 to the electronic device 104 can be based. In one aspect, the data transfer component 106 can include a processor (not shown) that can generate commands, handle communications and/or run applications to facilitate communication between the host component 102 and the electronic device 104. The data transfer component 106 can select a downlink clock frequency based in part on, information received from the electronic device 104. For example, the data transfer component 106 can generate a query that can be transmitted to the electronic device 104 requesting information associated with an optimal (e.g., maximum) clock frequency the electronic device 104 can accommodate and/or a clock frequency associated with a set standard or protocol associated with the type of electronic device. Also, based in part on such query information, the host component 102 can facilitate determining an uplink clock frequency, which can be a clock frequency upon which the transmission rate for data transmitted from the electronic device 104 and the host component 102 can be based, where the uplink clock frequency can be a clock speed that can be slower (e.g., lower frequency) than the downlink clock frequency. The data transfer component 106 can facilitate the selection of the uplink clock frequency based in part on a set standard or protocol associated with the type of electronic device 104 or a maximum receiving clock frequency that does not produce transfer errors, for example. In accordance with an aspect, a desirable downlink clock frequency can be 10 MHz and an uplink clock frequency can be 100 kHz, for instance.

In another aspect, after the downlink clock frequency is selected, the host component 102 can transmit data to the electronic device based in part on the downlink clock frequency, where the downlink clock frequency can be a higher frequency than the uplink clock frequency to facilitate efficient transfer and/or programming of data (e.g., large amounts of data) to the electronic device 104. The host component 102 can also receive data from the electronic device 104, and that data can be transmitted from the electronic device 104 at the slower uplink clock frequency. Thus, the host component 102 can facilitate asynchronous communication of data between the host component 102 and the electronic device 104.

For example, an electronic device 104 can be a smart card that can have data (e.g., applications, personalized data, etc.) programmed and stored in a memory 108 (e.g., flash memory) therein. The smart card can be structured such that it can accommodate an uplink clock frequency that corresponds with a standard protocol (e.g., ISO 7816-3), and can be compatible with downlink clock frequencies that can be the same as or different (e.g., higher clock frequency) from the standard protocol. The host component 102 can interface with the smart card, for instance, to program a relatively large amount of data to the smart card and can dynamically switch to a downlink clock frequency that is higher than the standard protocol. The data can be transmitted to the smart card based in part on the higher downlink clock frequency and can thereby transmit and/or program the data to the smart card more quickly than if the data was transmitted based on the clock frequency associated with the standard protocol.

It can be cost effective and/or more efficient to structure an electronic device 104 (e.g., smart card) so that a downlink data transmission can be performed at a same or different clock frequency than a standard protocol, and an uplink data transmission that can be performed in accordance with the standard protocol, for example. For instance, with a smart card, typically, small amounts of data are transmitted from the smart card to a host component 102, while often a relatively large amount of data (e.g., applications, personalized data, etc.) can be transmitted from the host component 102 and programmed to the smart card. Thus, there can be minimal benefit to structuring the smart card so that it can transmit data at a higher clock frequency, as the higher clock frequency can have minimal impact on the amount of time to transmit a relatively small amount of data. Further, the re-structuring of circuitry and components (e.g., output buffer (not shown)) in the smart card, so that the smart card could function to transmit data from the smart card at the higher clock frequency, can be less cost effective and/or an inefficient use of the relatively limited space (e.g., die space) available on an electronic device, like a smart card, given the minimal benefit gained with regard to a faster uplink data transmission.

However, with regard to the downlink data transmission, the circuitry and logic that can be employed to accommodate the faster downlink clock frequency(ies) are relatively minimal as input to the smart card can involve considerations relating to signal propagation and set up times, for example. Plus, there can be a significant reduction in programming time when the smart card(s) is programmed based on a downlink clock frequency that can be higher than the standard protocol, particularly where a high number of smart cards are programmed, for example, where the manufacturer or smart card issuer programs a high number of smart cards prior to issuing the smart cards to customers. As a result, it can be more efficient and/or cost effective to structure a smart card to be compatible with a higher downlink clock frequency as well as a clock frequency that accords with the standard protocol.

In accordance with still another aspect, when the host component 102 and the electronic device 104 initially interface, the downlink clock frequency can be the same as the uplink clock frequency, which can be prior to a data transmission of a large amount of data. Subsequently, the data transfer component 106 can dynamically select and/or switch the downlink clock frequency to the desired downlink clock frequency (e.g., faster clock frequency) and can transmit the data (e.g., large amount of data) based in part on the downlink clock frequency. In yet another aspect, when the host component 102 and the electronic device 104 initially interface, the data transfer component 106 can dynamically select and/or switch the downlink clock frequency to the desired downlink clock frequency and the host component 102 can facilitate transmitting the data to the electronic device 104 based in part on the downlink clock frequency.

It is to be appreciated that certain electronic devices (e.g., legacy electronic devices) can only utilize a clock frequency associated with a standard protocol (e.g., ISO 7816-3) and cannot accommodate a downlink data transmission at a higher clock frequency. In such instance, the host component 102 can facilitate transmitting data to such electronic device based in part on a downlink clock frequency that can be in accordance with the standard protocol.

Figure 2:
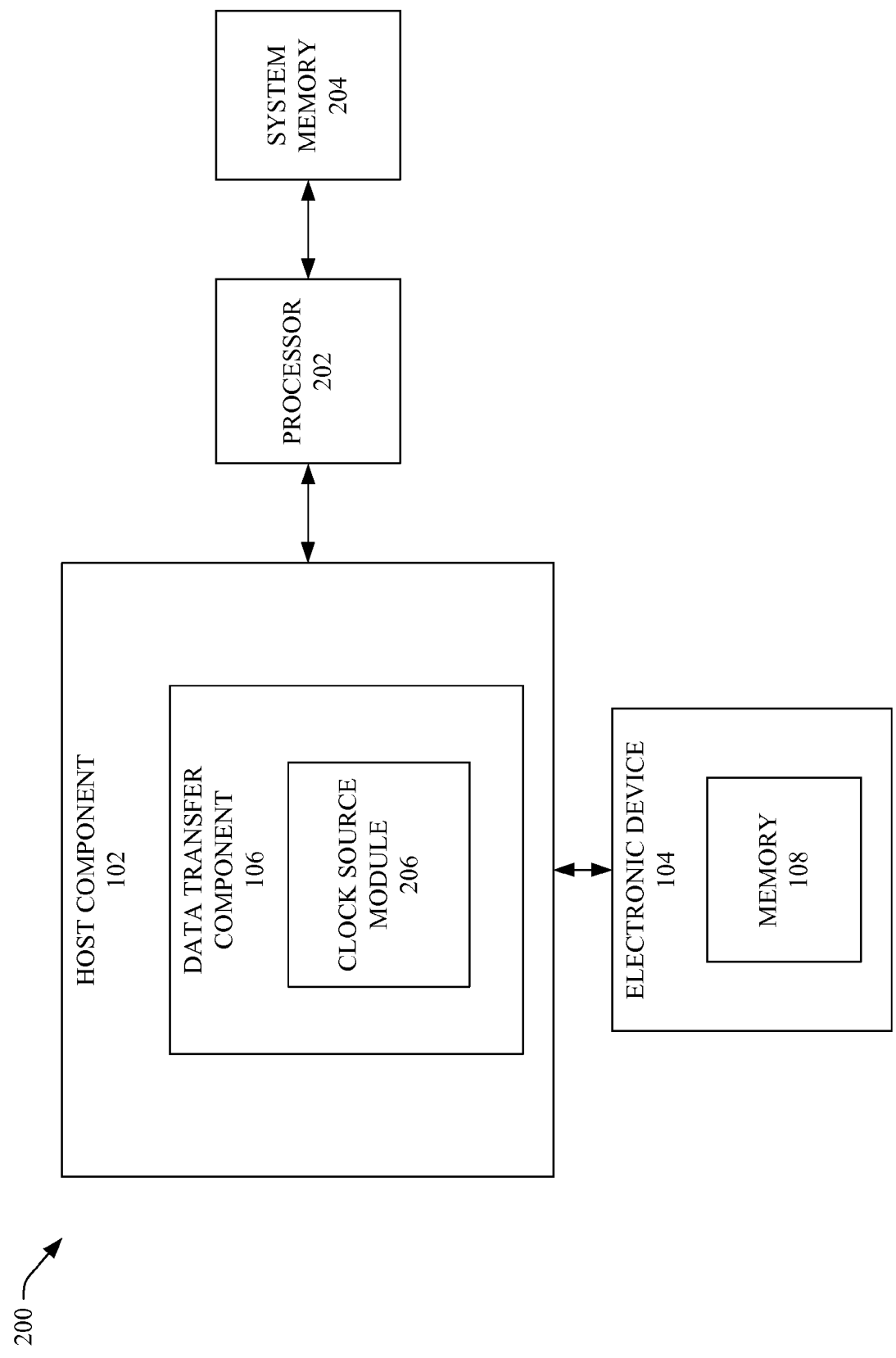
FIG. 2 depicts a block diagram of a system that facilitates establishing a clock frequency to facilitate transmission of data to an electronic device in accordance with an aspect of the disclosed subject matter.

Referring to FIG. 2, depicted is a block diagram of a system 200 that can facilitate data transmission associated with an electronic device in accordance with an aspect of the disclosed subject matter. System 200 can include a host component 102 that can facilitate transmission of data between the host component 102 and an electronic device 104 that can include a memory 108 (e.g., nonvolatile memory). The host component 102 can contain a data transfer component 106 that can facilitate transmission of data between the host component 102 and the electronic device 104, for example, by determining a desirable downlink clock frequency and/or desirable uplink clock frequency, where the transmission rate can be based in part on the respective clock frequencies. The host component 102, electronic device 104, data transfer component 106, and memory 108 can each include their respective functionality as more fully described herein, for example, with regard to system 100.

The host component 102 can be associated with a processor 202 that can be a typical applications processor that can handle communications and run applications. The processor 202 can operate in conjunction with the host component 102 to facilitate transmission of data between the host component 102 and an electronic device 104. The processor 202 can be associated with a system memory 204 that can be used as the primary system storage and can communicate with the processor 202. The system memory 204 can be comprised of volatile memory (e.g., random access memory (RAM) and/or nonvolatile memory (e.g., flash memory), for example. The data stored in the system memory 204 can include data that can be transmitted to the electronic device 104 and/or data received from the electronic device 104.

In accordance with one aspect, the host component 102 can communicate with the processor 202 via a bus that can be comprised of any of several types of bus structure(s) including, for example, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In accordance with an aspect, the data transfer component 106 in conjunction with the processor 202 can facilitate the selection of a downlink clock frequency and/or an uplink clock frequency. In one aspect, the processor 202 can utilize programs written in programming languages such as, for example, C, C++, Java, and/or firmware languages to facilitate the determination of the downlink clock frequency and/or the uplink clock frequency. In accordance with one aspect of the disclosed subject matter, the data transfer component 106 can determine and/or employ an appropriate protocol to facilitate communication between the host component 102 and the electronic device 104 based in part on the type of electronic device 104 to which data is to be transferred (e.g., programmed). For example, the processor 202 can determine that the electronic device 104 is a smart card device that can adhere to a standard protocol, such as the International Standards Organization (ISO) 7816-3, and thus can determine that the uplink clock frequency can be set in accordance with such protocol. In accordance with another aspect of the disclosed subject matter, the processor 202 in coordination with the data transfer component 106, for example, can determine that the electronic device 104 can support a protocol that can permit the downlink clock frequency to be different from the uplink clock frequency, and the data transfer component 106 can facilitate selecting and/or determining a downlink clock frequency and selecting and/or determining an uplink clock frequency to facilitate data transfers between the host component 102 and the electronic device(s) 104. In accordance with an aspect, the downlink clock frequency can be a higher frequency than the uplink clock frequency to facilitate efficient (e.g., faster) transmission of data to the electronic device 104 and/or efficient (e.g., faster) programming of data to the memory 108 that can be contained therein.

In accordance with an aspect, the processor 202 in coordination with the data transfer component 106 can facilitate selecting a downlink clock frequency from a specified number of possible frequency selections. In one aspect, the downlink clock frequency can be selected based in part on the fastest downlink clock frequency for which the electronic device 104 is rated, for example. In another aspect, the processor 202 in coordination with the data transfer component 106 can also facilitate determining the fastest downlink clock frequency based in part on the type of electronic device 104 and/or by obtaining information regarding a compatible downlink clock frequency from the electronic device 104. The processor 202 in coordination with the data transfer component 106 can facilitate determining an uplink clock frequency based in part on, for example, a predetermined frequency that can be based in part on a standard frequency associated with the electronic device(s) 104, and/or information that can be obtained from the electronic device(s) 104, for example. The data transfer component 106 can then facilitate dynamically selecting the downlink clock frequency during data transmits to the electronic device 104 and dynamically selecting and/or switching to the uplink clock frequency during data transmits from the electronic device 104 to the host component 102.

In accordance with another aspect, the data transfer component 106 can employ a clock source module 206 that can facilitate dynamically switching between the downlink clock frequency and the uplink clock frequency that each can be presented to the electronic device(s) 104 to facilitate controlling data transmission between the host component 102 and the electronic device 104. In accordance with an aspect of the disclosed subject matter, the clock source module 206 can employ the use of a multiplexer (mux) and/or AND gates, for example, to effectuate the dynamic switching between a downlink clock frequency and/or an uplink clock frequency.

For brevity, the clock source module 206 in system 200 is depicted only within the host component 102; however, it is to be appreciated that the clock source module 206 or a device with similar functionality can also be located within the electronic device 104. For example, a clock source module (e.g., 206) within the host component 102 and/or a clock source module within the electronic device 104 can each facilitate switching between transmitting data at a fixed frequency presented by the host component 102 for downlinks and/or operating at a fraction of the same fixed frequency presented by the host component 102 for uplinks. In one aspect, the host component 102 can facilitate presenting a constant fixed frequency to the electronic device 104 and the host component 102 and electronic device 104 can agree to respectively operate internally at a fraction of the constant fixed frequency during uplinks. For example, the respective clock source modules (e.g., one in the host component 102 and one in the electronic device) can operated at the fixed clock rate for downlinks and incorporate a clock divider circuit (e.g., via a counter circuit (not shown), for example) to operate at a divided version of the fixed clock frequency during uplinks.

Figure 3:
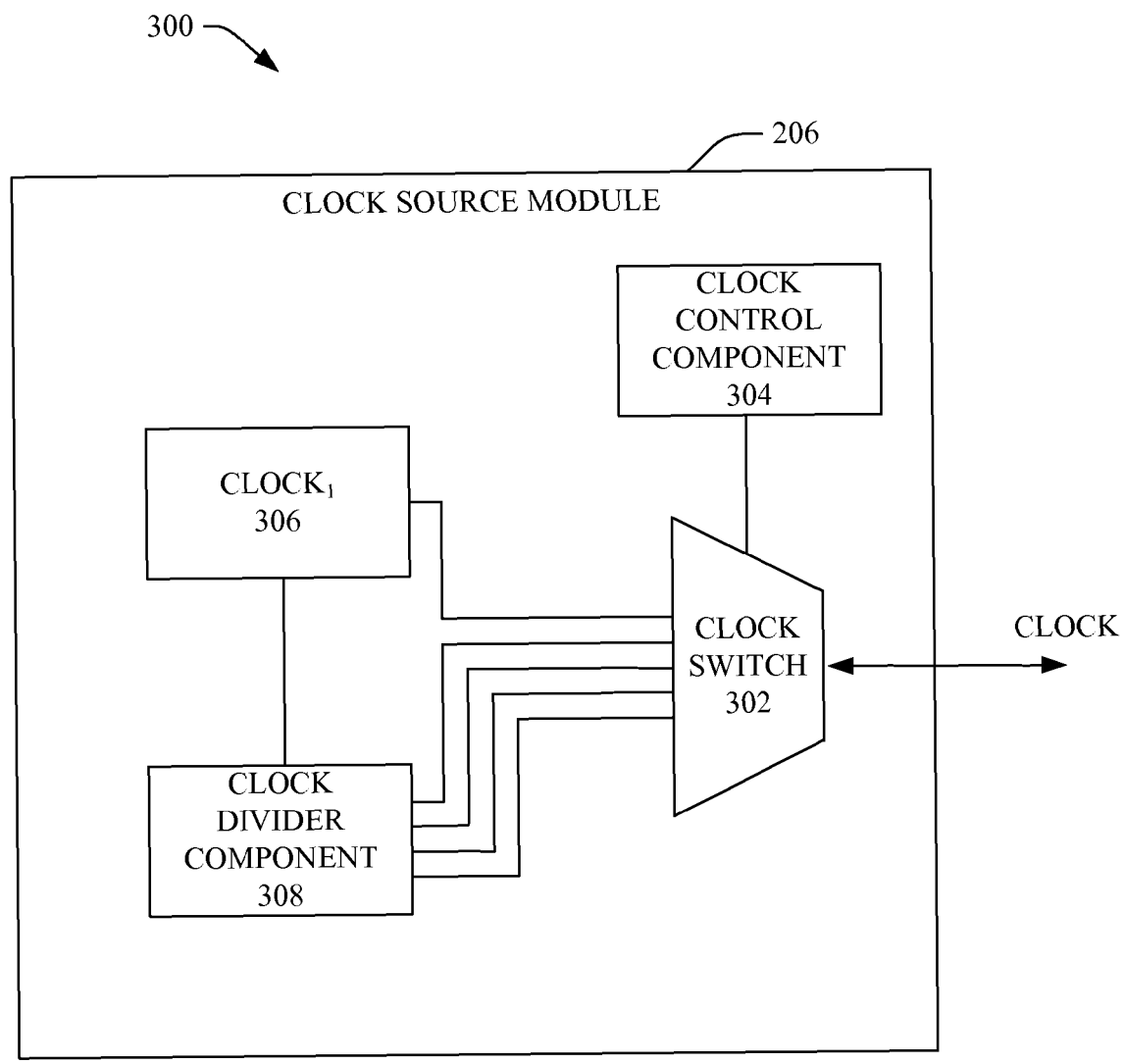
FIG. 3 illustrates a block diagram of a system that can facilitate selection of a clock frequency to facilitate data transmission associated with an electronic device in accordance with an aspect of the subject matter disclosed herein.

Turning to FIG. 3, illustrated is a system 300 that can facilitate selection of a clock frequency to facilitate data transmission associated with an electronic device in accordance with an embodiment of the disclosed subject matter. The system 300 can include a clock source module 206 that can facilitate selecting and/or switching between clock frequencies associated with a downlink and/or uplink between a host component 102 (not shown) and an electronic device 104 (not shown). In one aspect, the clock source module 206 can facilitate generating a desired clock frequency based in part on the type of operation (e.g., downlink, program, uplink, read, etc.) being performed, a type of electronic device (e.g., smart card, cellular phone, etc.), a type of protocol, etc. For example, the clock source module 206 can facilitate selecting and/or generating a downlink clock frequency and/or an uplink clock frequency, where the downlink clock frequency can be a faster clock frequency than the uplink clock frequency.

In one aspect, the clock source module 206 can be comprised of a clock switch 302 (e.g., a mux or AND gates) that can effectuate the decision of a clock control component 304 as to the clock frequency(ies) to select and/or generate during data transfers associated with a downlink transmission and/or uplink transmission. It is to be appreciated that the clock control component 304 can be comprised of a processor (not shown) or other logic to facilitate the determination of what associated clock frequency(ies) that can be selected for data transmits to/from the electronic device 104.

It is to also be appreciated that the described subject matter contemplates the use of a processor (e.g., 202) and/or a program associated with the processor wherein the process can be located outside of the clock control component 304. The disclosed subject matter further contemplates that other components, such as other components located in the data transfer component (e.g., 106), for example, can help facilitate the determination of a downlink clock frequency and/or an uplink clock frequency that can be used for data transfers between the host component (e.g., 102) and the electronic device (e.g., 104). For example, the clock control component 304 can be comprised of logic that can route/direct control signals from other decision making components (e.g., processor 202 and/or components located in the data transfer component 106) to control signals or a sequence of control signals to the clock switch 302.

In accordance with one aspect of the disclosed subject matter, the clock source module 206 can include a $clock_1$ 306 that can be a clock generator for generating a clock signal that can be used by the host component 102 and the electronic device 104 to facilitate data transfers. In accordance with an aspect, the clock source module 206 can employ a clock divider component 308 that can divide down the frequency generated by the $clock_1$ 306. For brevity only one $clock_1$ 306 and one clock divider component 308 are depicted in FIG. 3; however, it is to be appreciated that any number of $clock_1(s)$ 306 and/or clock divider component(s) 304 can be employed in accordance with the disclosed subject matter. For example, there can be one $clock_1$ 306 (e.g., clock source or baud rate generator) associated with two or more clock divider component(s) 304 and/or there can be two or more $clock_1(s)$ 306 each of which can be associated with at least one clock divider component(s) 308, for example. The subject innovation is not delimited and the disclosed subject matter contemplates virtually any number of different clock speeds that can be used to facilitate data transfers in accordance with the disclosed subject matter.

As illustrated, the clock divider component 308 can divide the clock frequency generated by the $clock_1$ 306 to a plurality of different divided clock frequencies of which any one can be presented to the clock switch 302 for selection based on control signals received from the clock control component 304, for example. It is to be appreciated that the clock component divider 308 can divide the clock signal (e.g., the clock generated from $clock_1$ 306) into virtually any clock speed (e.g., frequency). The clock control component 304 can facilitate the selection of one or more of the clock frequencies that provided to the clock control component 304, where the clock control component 304 can select at least one of the provided clock frequencies to facilitate transferring data between the host component 102 and the electronic device 104.

It is to be appreciated that the clock control component 304 can inherently contain the logic necessary to facilitate the determination of a downlink clock frequency and/or an uplink clock frequency that can be used with a particular electronic device(s) 104 (e.g., smart card, personal digital assistant, electronic game, digital camera, electronic organizer, etc.). It is to be further appreciated that, for example, a processor (e.g., 202) can also run applications and/or computer routines and can operate in association with the clock control component 304 to facilitate determination of the downlink clock frequency and/or the uplink clock frequency.

Once the transmitting clock frequency is determined, in accordance with one aspect of the disclosed subject matter, the clock control component 304 can send associated control signals to the clock switch 302 to effectuate the selection of the determined downlink clock frequency. In turn, when the host component 102 receives data (e.g., uplink), the clock control component 304 can send associated control signals to the clock switch 302 to effectuate the selection of the determined uplink clock frequency.

In accordance with an aspect of the disclosed subject matter, the downlink clock frequency and the uplink clock signal can be different frequencies, where the downlink clock frequency can be higher than the uplink clock frequency. The clock control component 304 can control (e.g., vary) the control signals to allow the clock switch 302 to provide the downlink clock frequency when transmitting data from the host component 102 to the electronic device and/or provide an uplink clock frequency when transmitting data from the electronic device 104 to the host component 102.

In accordance with another aspect of the disclosed subject matter, the downlink clock frequency and the uplink clock signal can be the same frequency. The clock control component 304 can hold the appropriate control signals to a constant value to allow the clock switch 302 to maintain a constant clock frequency when transmitting data from the host component 102 to the electronic device (e.g., downlink) and when transmitting data from the electronic device 104 to the host component 102 (e.g., uplink).

Figure 4:
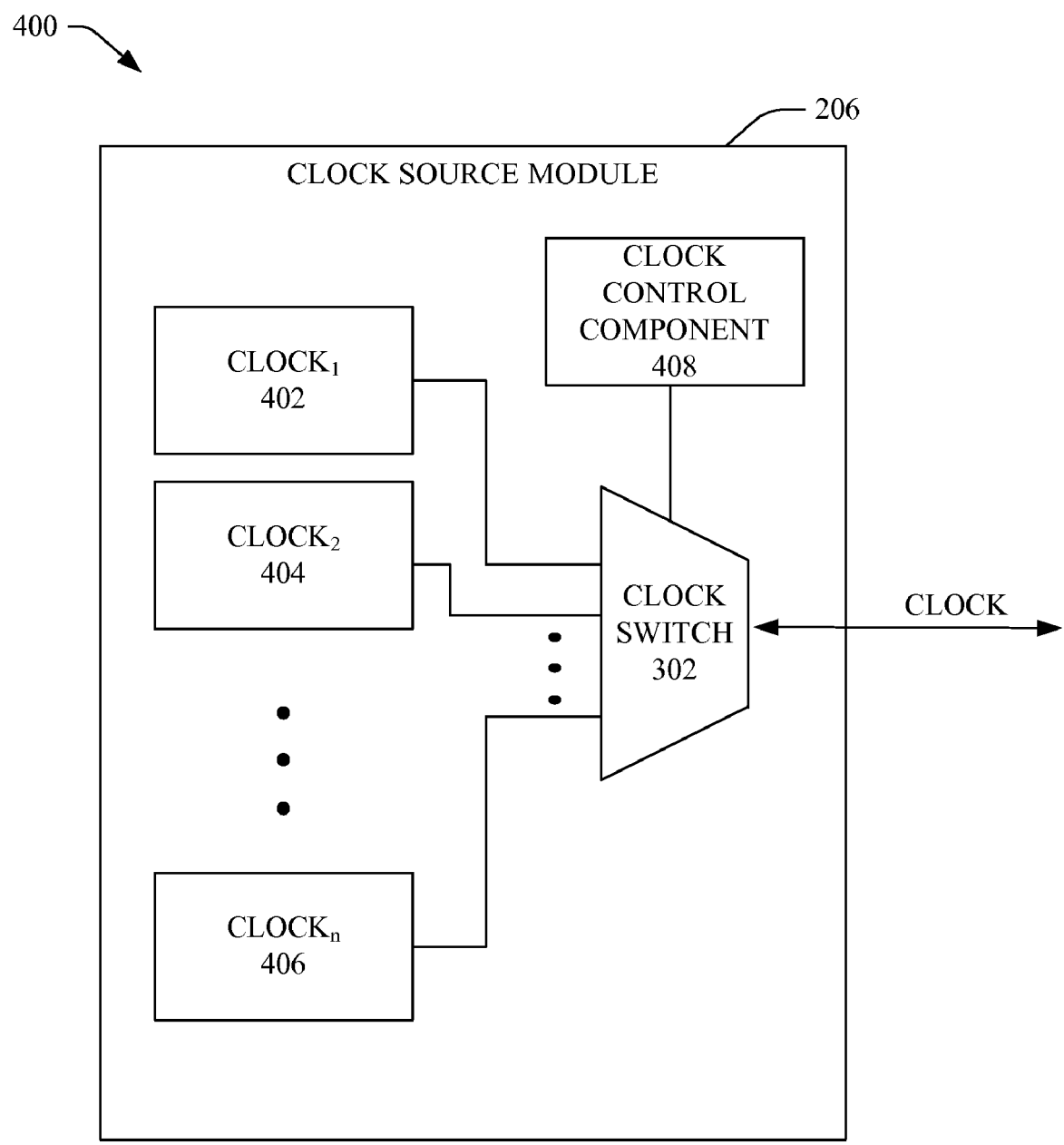
FIG. 4 illustrates a block diagram of a system that can facilitate selection of a clock frequency to facilitate data transmission associated with an electronic device in accordance with an embodiment of the disclosed subject matter.

Referring to FIG. 4 illustrated is system 400 that can facilitate selection of a clock frequency to facilitate data transmission associated with an electronic device in accordance with another embodiment of the disclosed subject matter. The system 400 can include a clock source module 206 that can facilitate generating one or more different clock frequencies, and/or selection of and/or switching between generated clock frequencies. For example, the clock source module 206 can facilitate switching between a downlink clock frequency that can be faster than an uplink clock frequency, where the downlink clock frequency can be employed to transmit data from a host component (e.g., 102) (not shown) to an electronic device (e.g., 104) (not shown) at a faster rate than the transmission rate associated with the uplink clock frequency, which can be employed to transmit data from the electronic device to the host component.

In accordance with one aspect, the clock source module 206 can be comprised of a plurality of clocks (e.g., clock sources and/or clock generators) in accordance with the disclosed subject matter. For example, as depicted in system 400 of FIG. 4, the clock source module can be comprised of a plurality of clock sources, such as n clocks, $clock_1$ 402, $clock_2$ 404, up through $clock_n$ 406 (hereinafter referred to collectively as "clocks 402, 404, 406").

In accordance with one aspect of the disclosed subject matter, the clock control component 408 can facilitate determining a downlink clock frequency based in part on a type of electronic device to which data is to be transmitted and/or the available clock frequencies associated with the electronic device. For example, the clock control component 408 can receive information regarding clock frequencies that can be utilized to facilitate transmitting data to the electronic device and can facilitate determining a maximum downlink clock frequency that can be employed by the data transfer component (e.g., 106) (not shown), in which the clock source module can reside, to facilitate transmitting data from the host component to the electronic device, and the clock source module 408 can generate the desired downlink clock frequency, which can be the maximum clock frequency that can be compatible for data transmission with the electronic device.

In accordance with an aspect, during an initialization of the electronic device 104, the clock control component 408 can interrogate the electronic device 104 to determine if a downlink clock frequency(ies) that can be used to transmit data from the host component 102 to the electronic device 104. The clock control component 408 can determine the highest clock frequency that can be compatible with the electronic device 104 and can facilitate selecting the clock (e.g., clocks 402, 404, 406) to be the downlink clock frequency based in part on such highest clock frequency. In accordance with another aspect of the disclosed subject matter, the data transfer component 106 and/or the clock control component 408 can deduce from the type of electronic device (e.g., smart card, personal digital assistant (PDA), electronic game, etc.; manufacturer and/or model of electronic device) the highest downlink clock frequency that can be utilized to facilitate transmitting data to the electronic device 104.

In another aspect, the clock control component 408 can facilitate determining an uplink clock frequency that can be based in part on the maximum uplink clock frequency an electronic device 104 can employ while the electronic device 104 transmits data to the host component 102. For example, during an initialization of the electronic device 104, the clock control component 408 can interrogate the electronic device 104 to determine an uplink clock frequency(ies) that can be used to transmit data from the electronic device 104 to the host component 102. In accordance with another aspect of the disclosed subject matter, the clock control component 408 can determine an uplink clock frequency based in part on the type of electronic device (e.g., smart card, PDA, etc.; manufacturer of and/or model of electronic device).

The clock control component 408 can employ a clock switch 302 (e.g., a mux or AND gates, for example) to effectuate the selection of a clock source (e.g., clocks 402, 404,

406). For example, during a data transmit (e.g., a downlink) the clock control component 408 can facilitate supplying the appropriate control signals to the clock switch 302 to select the determined downlink clock frequency. The selected downlink clock frequency can be supplied to the electronic device 104 throughout the duration of the downlink data transmission. In turn, during an uplink the clock control component 408 can facilitate supplying the appropriate control signals to the clock switch 302 to select the determined uplink clock frequency. The selected uplink clock frequency can then be supplied to the electronic device 104 throughout the duration of the uplink data transmission from the electronic device 104 to the host component 102.

It is to be appreciated that clocks 402, 404, 406 along with the clock control component 408, the clock switch 302, or any combination thereof, can be contained on a single integrated circuit (IC) chip and/or contained on a stand-alone application-specific integrated-circuit (ASIC) chip.

Figure 5:
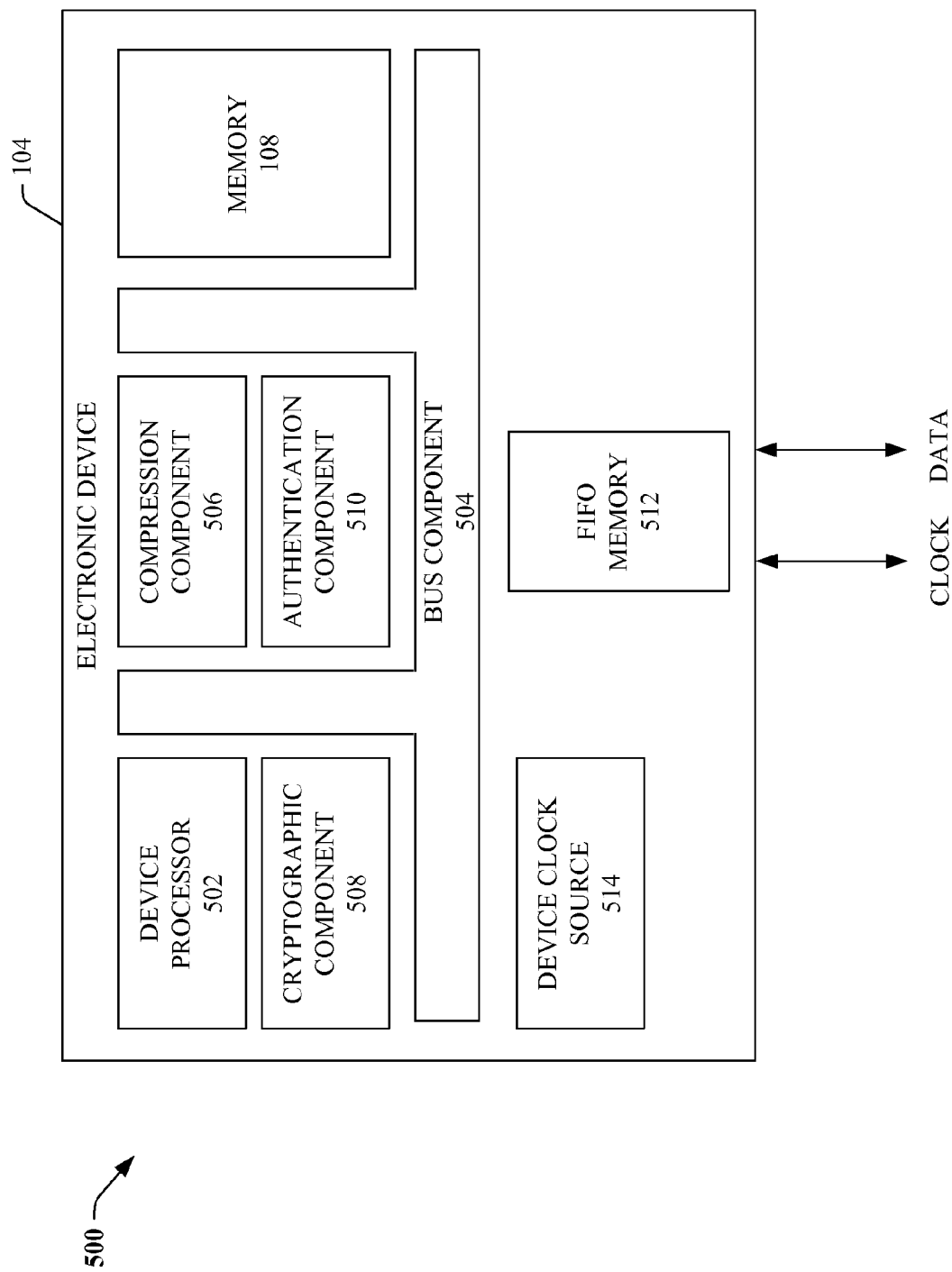
FIG. 5 depicts an example diagram of an electronic device in accordance with the disclosed subject matter.

Turning to FIG. 5, depicted is a block diagram of a system 500 that can facilitate storage of data associated with an electronic device in accordance with the disclosed subject matter. In accordance with an embodiment of the disclosed subject matter, system 500 can include an electronic device 104 that can include a memory 108 that can receive data, can store data, and can provide data as an output. Each of the electronic device 104 and the memory 108 can be the same as or similar to, and can include such respective functionality, as more fully described herein, for example, with regard to system 100, system 200, system 300, and/or system 400. Memory 108 can include one or more memory locations (e.g., memory cells) (not shown) in which data can be programmed and from which data can be read (or erased). The memory 108 can be comprised of ROM, flash memory (e.g., single-bit flash memory, multi-bit flash memory), mask-programmed ROM, PROM, EPROM, UV-erase EPROM, one-time programmable ROM, and/or EEPROM, for example.

In accordance with one embodiment of the disclosed subject matter, system 500 can include a device processor 502 that can be associated with the memory 108. The device processor 502 can be a typical applications processor that can manage communications and run applications. For example, the device processor 502 can be a processor that can be utilized by a computer, a mobile handset, PDA, or other electronic device. The device processor 502 can generate commands, including read, write, and/or erase commands, in order to facilitate reading data from, writing data to, and/or erasing data from the memory 108, where the communication of information between the device processor 502 and the memory 108 can be facilitated via a bus component 504.

In accordance with another embodiment, the device processor 502 can be a stand-alone unit that can be associated with the electronic device 104, and can generate and execute commands to access data to/from the memory 108.

The bus component 504 can provide a network or electrical interconnect between electric and/or semiconductor components within the electronic device 104 including, but not limited to, the device processor 502, a compression component 506, a cryptographic component 508, an authentication component 510, first-in first-out (FIFO) memory 512, device clock source 514, and/or the memory 108. The bus component 504 can be comprised of any of several types of bus structure(s) including the memory bus or memory controller, a peripheral bus or external bus, and/or a local bus using any variety of available bus architectures including, but not limited to, Advanced Microcontroller Bus Architecture (AMBA), Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In accordance with an aspect of the disclosed subject matter, a processor (e.g., 206) associated with a host component (e.g., 102), a data transfer component (e.g., 106), or combination thereof, can query the device processor 502, the memory 108, or other electronic component located in the electronic device 104 (shown and/or not shown), or any combination thereof, to determine a downlink clock frequency and/or an uplink clock frequency that can be associated with a pending data transfer(s) (e.g., such as during an initialization phase of the electronic device 104). The query can ascertain such information as a desired frequency setting for the downlink clock frequency and/or the uplink clock frequency, the type of device the electronic device 104 is (e.g., smart card, PDA, electronic game, etc.), the brand or model of the electronic device 104, the date of manufacture of the electronic device 104, and/or other information, for example, to facilitate determination of a downlink clock frequency and/or uplink clock frequency that can be employed to facilitate transmitting data between the host component 102 and the electronic device 104.

In accordance with another aspect of the disclosed subject matter, a data transfer component (e.g., 106) and/or a processor (e.g., 202) can facilitate the selection of the downlink clock frequency by utilizing the information obtained from the electronic device(s) 104 (e.g., brand or model of the electronic device, the date of manufacture of the electronic device) to determine an appropriate downlink clock frequency. Likewise, the data transfer component 106 and/or the processor (e.g., 202), for example, can facilitate the selection of the uplink clock frequency by utilizing the information obtained from the electronic device(s) 104 to determine an appropriate uplink clock frequency. The data transfer component 106 (e.g., and/or the clock control component 304 therein) and/or the processor (e.g., 202) can employ a clock switch (e.g., 302) to effectuate the switching between the determined downlink clock frequency and the determined uplink clock frequency during subsequent respective data transmits to the electronic device 104 (downlinks) and transmits to the host device 102 from the electronic device 104 (uplinks).

To facilitate the programming of data to the memory 108 and/or other data transmissions associated with the electronic device 104, the FIFO memory 512 can be employed to buffer the data that is to be transmitted to the electronic device 104 and/or transmitted from the electronic device 104. In accordance with one aspect of the disclosed subject matter, the device processor 502 can facilitate the movement of transmitted data accumulated in the FIFO memory 512 to and/or from the memory 108. It is to be appreciated and understood that, while the FIFO memory 512 is depicted as being inside the electronic device 104, but outside of the memory 108, the subject innovation is not so limited, as, in accordance with various other embodiments of the disclosed subject matter, the FIFO memory 512 can be included within the memory 108, or can be a stand-alone unit.

Conventionally, for communications with smart card devices, for example, a standard protocol, such as the International Standards Organization (ISO) 7816-3, can be employed to ensure a host component 102 and the smart card devices (e.g., 104) can communicate effectively. The ISO 7816-3 standard can, for example, limit the block size of data transmitted to the smart card to 256 bytes of information (e.g., Application Protocol Data Unit (APDU)). It is to be appreciated that the subject disclosure envisages potential deviations from such protocols to accommodate the desire to transfer larger amounts of data between the host component 102 and the electronic device(s) (e.g., 104), as such electronic device(s) 104 can be comprised of a relatively large memory capacity (e.g., memory 108).

In accordance with one embodiment of the disclosed subject matter, the FIFO memory 512 can store larger chunks of data (e.g., 1024 bytes, 2048 bytes, etc.) to facilitate the transfer of data between the electronic device 104 and other components (e.g., host component 102).

In accordance with another aspect of the disclosed subject matter, a processor (e.g., 206), the device processor 502, or combination thereof, can facilitate a signature authentication requirement for end-users or entities to access the data stored in the memory 108. In applications where such authentication is implemented, system 500 can include an authentication component 510 that can solicit authentication data from an entity or user, and, upon the authentication data so solicited, can be employed, individually and/or in conjunction with information acquired and ascertained as a result of biometric modalities employed, to facilitate control access to the memory 108. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 510. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 510 can also implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with yet another aspect of the disclosed subject matter, the processor 206 (not shown), the device processor 502, the data transfer component 106 (not shown), or a combination thereof, can facilitate the encryption and/or decryption of data that can be stored in the memory 108 by directing the accumulated data in FIFO 512 to the cryptographic component 508 prior to storing the data into the memory 108. The cryptographic component 508 can include a security engine (not shown) that can be configured to perform cryptographic functions that can facilitate securing data written to, stored in, and/or read from the memory 108. Cryptographic functions, such as, for example, encryption, decryption, key generation, and/or hash, to facilitate data security can be employed in conjunction with the device processor 502 and can include use of symmetric and/or asymmetric algorithms, such as Advanced Encryption Standard (AES)—a block symmetric key cipher, Data Encryption Standard (DES), Triple Data Encryption Standard (3DES)—a block cipher form by utilizing the DES cipher at least three times, Secure Hash Algorithm (SHA) and its variants such as, for example, SHA-0, SHA-1, SHA-224, SHA-256, SHA-384, and SHA-512, and the Rivest, Shamir, and Adleman (RSA) encryption algorithm, and the like.

In accordance with yet another aspect of the disclosed subject matter, the processor 206 (not shown), the device processor 502, the data transfer component 106 (not shown), or combination thereof, can facilitate compression of data that can be stored in the memory 108 by directing the accumulated data in the FIFO 512 through the compression component 506 prior to storing the data into the memory 108. The compression component 506 can provide compression of data by encoding information using fewer bits than an unencoded representation of data would use through use of encoding schemes that can employ data compression algorithms, such as lossless compression algorithms or lossy compression algorithms, for example. The compression component 506 can be used in conjunction with any combination of other electric and/or semiconductor components (e.g., cryptographic component 508, authentication component 510, device processor 502) to perform a combination of operations on the data accumulated in the FIFO 512 to be stored in the memory 108.

In still another aspect, the electronic device 104 can further include a device clock source 514 that can provide a clock signal that can be utilized to facilitate the timing of functions that are being performed by respective components (e.g., device processor 502, cryptographic component 508, memory 108, etc.) within the electronic device 104. The device clock source 514 can provide one or more clock frequencies (e.g., clock frequency in accordance with the ISO 7816-3 protocol) to facilitate synchronized performance of functions by the electronic device 104 and components therein. In accordance with an aspect, when the host component 102 interfaces with the electronic device 104 to communicate with the electronic device 104, the clock source module 206 can provide to the electronic device 104 the downlink clock frequency and/or uplink clock frequency associated with the data transmission between the host component 102 and electronic device 104. Certain components (e.g., electronic device interface (not shown)) can be controlled or can function based in part on the clock frequency provided by the host component 104. It is to be appreciated and understood that, during the data transmission, the device clock source 514 can still provide a clock signal(s) to other components (e.g., device processor 502) that are not directly associated with the host component 102.

It is to be understood and appreciated that one or more of the components, such as the authentication component 510, cryptographic component 508, and/or compression component 506 can be included within the electronic device 104, as depicted in FIG. 5, or stand-alone units that can be associated with the electronic device 104, or a combination thereof.

In accordance with one embodiment, the electronic device 104 can be implemented and/or contained on a single IC chip. In accordance with another embodiment, the electronic device 104 can be implemented and/or contained on a stand-alone application-specific integrated-circuit (ASIC) chip.

Figure 6:
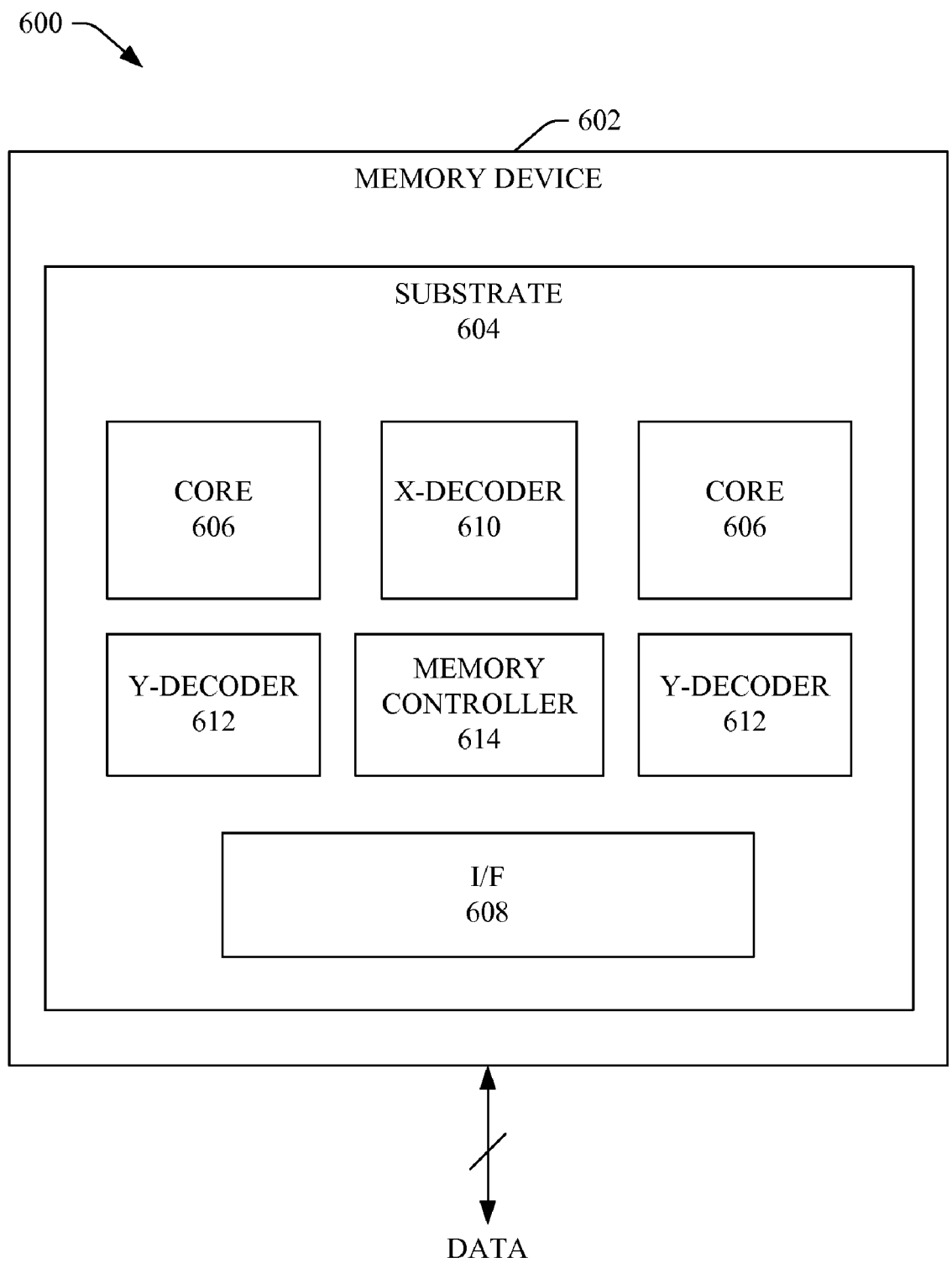
FIG. 6 depicts a block diagram of an example of a system that can store data in accordance with an embodiment of the disclosed subject matter.

Referring to FIG. 6, illustrated is a block diagram of a system 600 that can facilitate storage of data in accordance with the disclosed subject matter. In accordance with an aspect, the system 600 can be or can include a memory device 602, which can be a flash memory (e.g., single-bit flash memory, multi-bit flash memory), that can be created on a semiconductor substrate 604 in which one or more core regions 606, which can be higher-density core regions, and one or more peripheral regions, which can be lower-density regions, can be formed. The high-density core regions 606 can include one or more M by N arrays of individually addressable, substantially identical multi-bit memory cells (not shown). The memory cells in memory device 602 can retain stored data even while disconnected from a power source.

The lower-density peripheral regions can typically include an interface component 608 (hereinafter also referred to as "I/F 608") and programming circuitry for selectively addressing the individual memory cells. The programming circuitry can be represented in part by and can include one or more x-decoders 610 and one or more y-decoders 612 that can cooperate with the I/F 608 for selectively connecting a source, gate, and/or drain of selected addressed memory cells to predetermined voltages or impedances to effect designated operations (e.g., programming, reading, erasing) on the respective memory cells, and deriving necessary voltages to effect such operations. Further, the I/F 608 can include and/or provide various adapters, connectors, channels, communication paths, etc. to integrate the system 600 into virtually any operating and/or database system(s) and/or with another system(s). In addition, I/F 608 can provide various adapters, connectors, channels, communication paths, etc., that can provide for interaction and/or communication with other components, data, and the like, associated with the system 600.

System 600 can also include a memory controller component 614 that can facilitate control of the flow of data to and from the memory device 602. In one aspect, the memory controller component 614, by itself or in conjunction with a host processor (e.g., 202, 502), can facilitate execution of operations (e.g., read, write, erase) associated with memory locations in the core(s) 606. In another aspect, the memory controller component 614 can facilitate verifying and/or maintaining the desired charge level(s) associated with data stored in the memory locations in the core(s) 606. In accordance with one embodiment of the disclosed subject matter, the memory 108 can be or can include the memory device 602.

Figure 7:
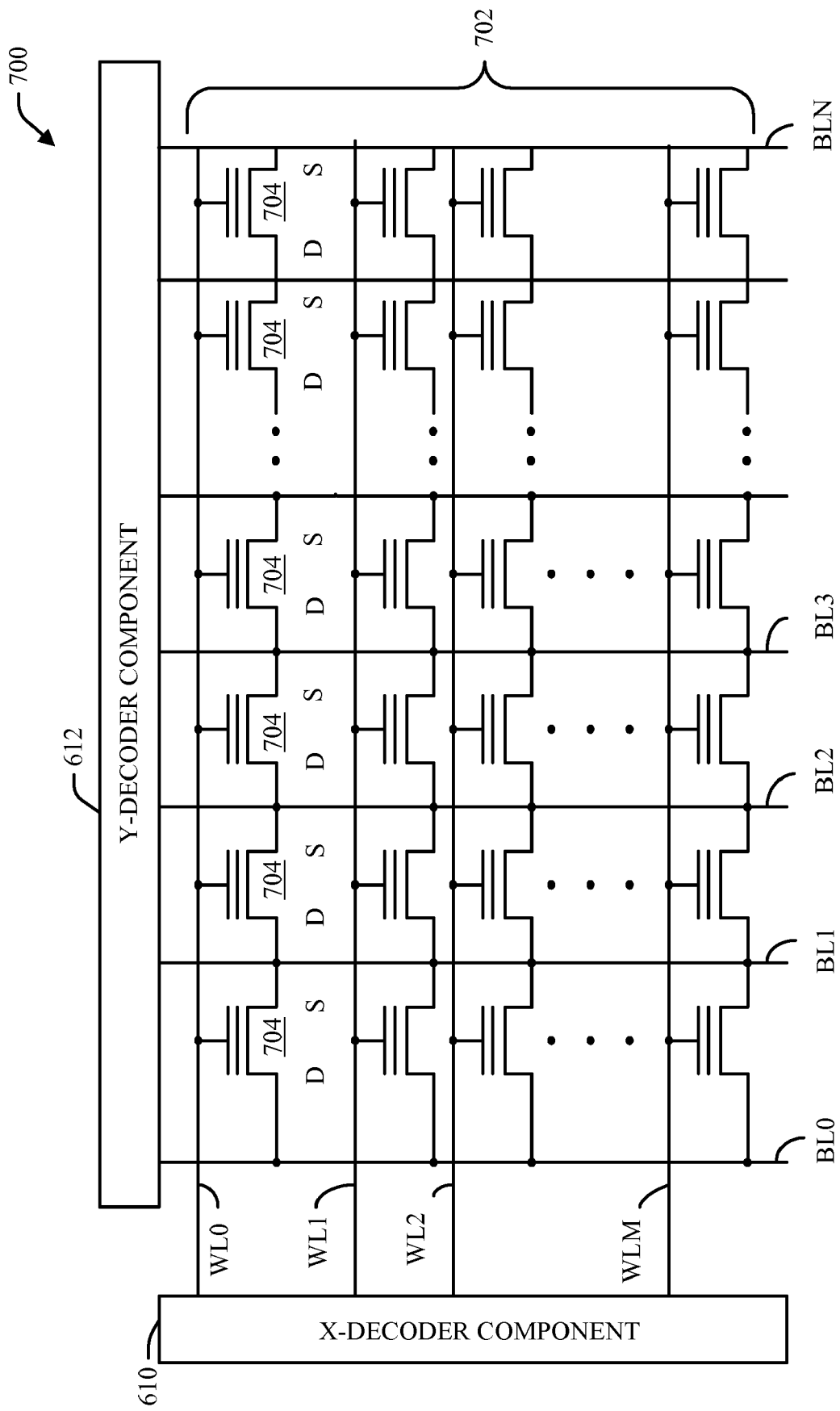
FIG. 7 depicts an example diagram of a system that can facilitate data storage in accordance with an embodiment of the disclosed subject matter.

Turning to FIG. 7, depicted is an example diagram of a system 700 that can facilitate data storage in accordance with the disclosed subject matter. The system 700 can include a memory array(s) 702 that can include a plurality of memory cells 704 that each can be comprised of a drain/source, gate, and source/drain. In accordance with an aspect, each memory cell 704 can be a multi-level cell, where data can be represented by the level of charge stored within the cell 704. In accordance with another aspect, one or more bits of data can be stored in each memory cell 704. The memory array 702 can be included in the memory (e.g., 108) described in system 100 and/or system 500, and/or the memory device 602 described in system 600, for example.

The system 700 can include an X-decoder component(s) 610 (e.g., word line (WL) decoder) and a Y-decoder component(s) 612 (e.g., bit line (BL) decoder) that can each respectively decode inputs/outputs during various operations (e.g., programming, reading, verifying, erasing) that can be performed on the memory cells 704. The X-decoder component 610 and Y-decoder component 612 can each receive address bus information from a host processor (e.g., 202, 502) and/or system controller (not shown) or the like, and can utilize such information to facilitate accessing or selecting the desired memory cell(s) 704 (e.g., memory location(s)) associated with the command. The memory cells 704 can be formed in M rows and N columns. A common WL can be attached to the gate of each memory cell 704 in a row, such as word-lines WL0, WL1, WL2, through WLM. A common BL can be attached to each cell 704 in a column, such as bit-lines BL0, BL1, through BLN. A WL can contain, for example, a plurality of elements (e.g., 512, 1024, 2048, etc.) forming multiple words. A sector can include a plurality of WLs, such as, for example, 512 WLs that can provide 512 k elements of memory. In accordance with an aspect of the disclosed subject matter, respective voltages can be applied to one or more memory cells 704 through the WLs and BLs to facilitate performing operations, such as program, read, erase, and the like.

It is to be appreciated that while the memory cells 704 are shown as being respectively associated with a drain and a source, in accordance with one embodiment, where a memory cell 704 contains charge storage elements on two sides of the cell 704 that can each be programmed, the drain can act as the source, and/or the source can act as the drain, depending on which portion of the memory cell 704 is being charged during a given operation.

Figure 8:
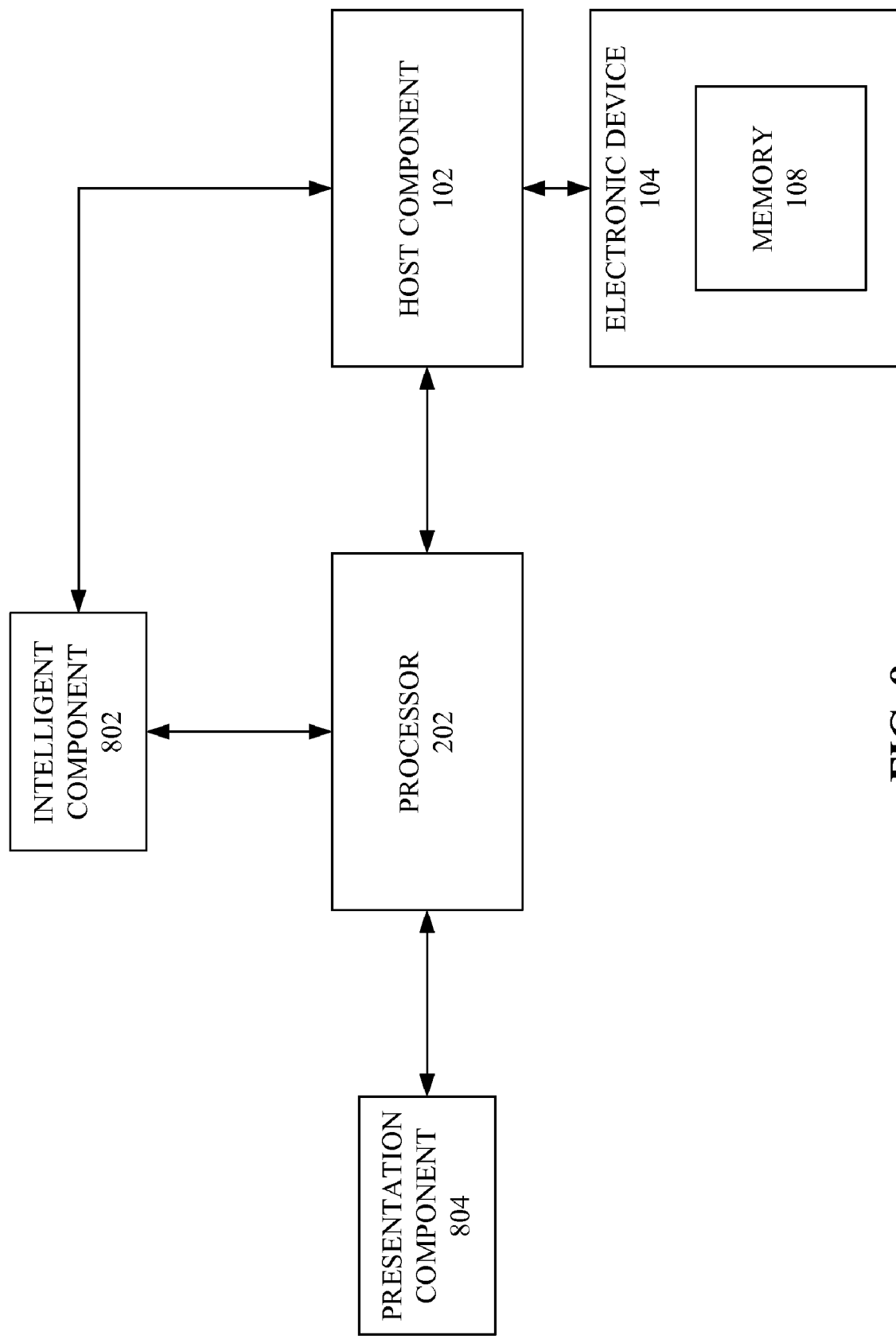
FIG. 8 depicts a block diagram of a system that employs intelligence to facilitate transmission of data associated with an electronic device in accordance with the disclosed subject matter.

Turning to FIG. 8, depicted is a system 800 that can employ intelligence to facilitate transmission of data in accordance with the disclosed subject matter. System 800 can include a processor 202 and host component 102, which can include a data transfer component 106 (not shown), that can facilitate transmitting data to or receiving data from an electronic device(s) 104, which can include a memory 108, at a respective clock frequency based in part on the type of data transfer (e.g., downlink, uplink). The host component 102, the data transfer component 106, the processor 202, the electronic device(s) 104, and the memory device(s) (e.g., 108, 602) each can be substantially similar to respective components and can include such respective functionality as more fully described herein, for example, with regard to system 100, system 200, system 300, system 400, system 500, system 600, and/or system 700.

The system 800 can further include an intelligent component 802 that can be associated with the host component 102, and can analyze data, and based in part on such data, can make an inference(s) and/or a determination(s) regarding a data value, an electronic device 104 (e.g., type, available clock frequency(ies), etc.), a downlink clock frequency, an uplink clock frequency, an automated function that can be performed by a component (e.g., host component 102) associated with system 800, etc. For example, the intelligent component 802 can evaluate current (e.g., query information) and/or historical information associated with an electronic device 104, and based in part on such information and/or predefined criteria, can make an inference as to an optimal downlink clock frequency and/or uplink clock frequency for data transfers between the host component 102 and the electronic device 104 where the predefined criteria can include, for instance, the type of electronic device 104 (and/or the type of memory 108 therein), the type of operation (e.g., program, read, data transfer, etc.), a communication protocol that can be required by a specific type of electronic device 104, and/or the size of the buffer memory (e.g., FIFO memory 512) associated with the electronic device 104.

As another example, during a program operation, the intelligent component 802 can analyze current and/or historical information associated with the electronic device 104 to be programmed and can infer that the electronic device 104 can accommodate data chunks that can be larger in size than the data chunks typically associated with a standard protocol, and can communicate such inference to the host component 102, which can structure the size of the data chunks to an optimal size (e.g., maximum size that can be accommodated by the electronic device 104) to facilitate efficient transmission of data from the host component 102 to the electronic device 104.

It is to be understood that the intelligent component 802 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 800 also can include a presentation component 804 that can present data associated with the processor 202 and/or the data transfer component 106. It is to be appreciated that the presentation component 804 can be incorporated into the processor 202 and/or a stand-alone unit. The presentation component 804 can provide various types of user interfaces to facilitate interaction between a user and any component coupled to the processor 202.

The presentation component 804 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor 202.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
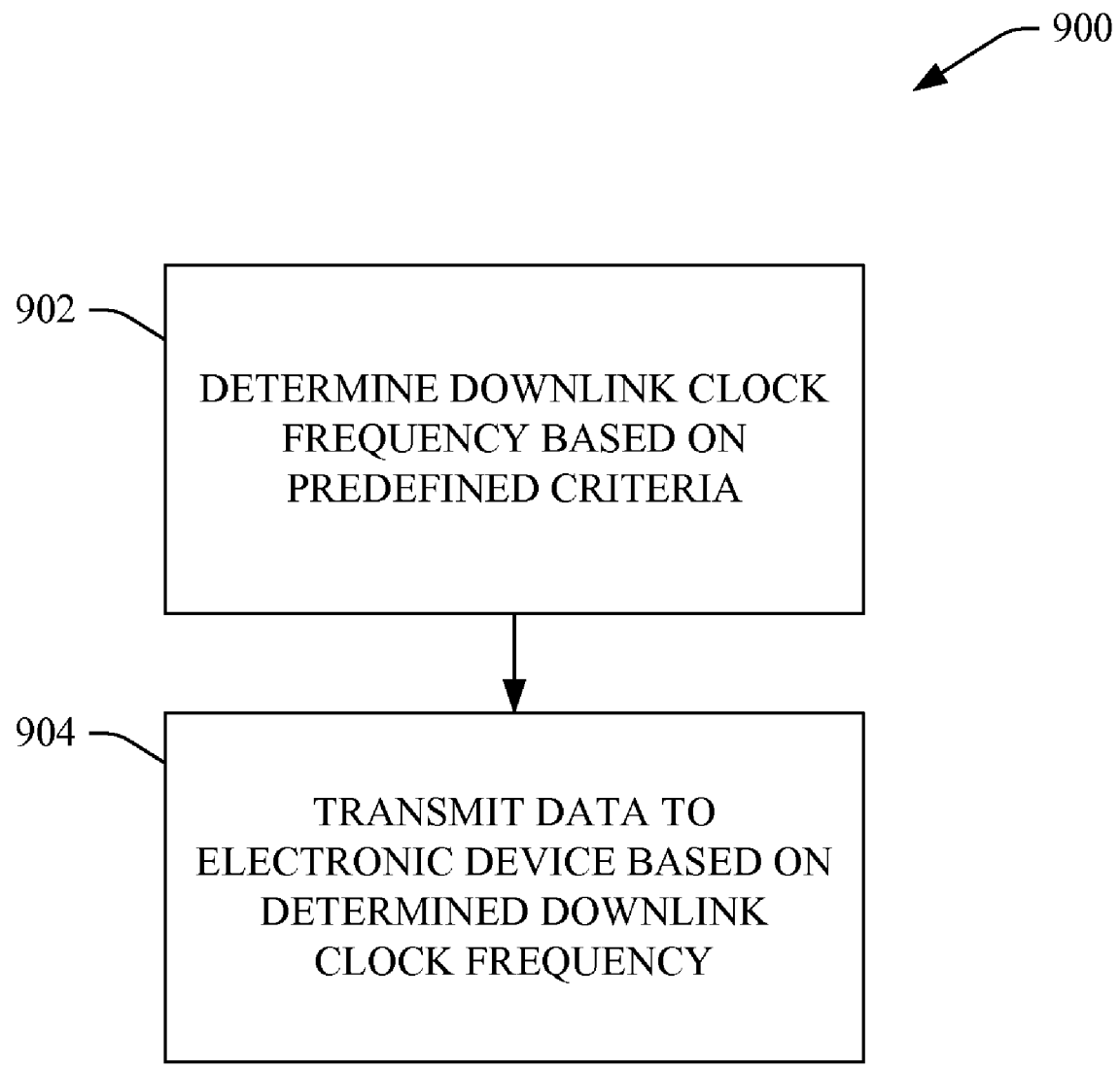
FIG. 9 illustrates a methodology that facilitates transmission of data associated with an electronic device in accordance with an aspect of the disclosed subject matter.

Referring to FIG. 9, a methodology 900 that can facilitate transmitting data associated with an electronic device in accordance with the disclosed subject matter is illustrated. At 902, a downlink clock frequency can be determined. The downlink clock frequency can be determined based in part on predefined criteria, such as, for example, the type of electronic device (e.g., 104) to which the data is to be transmitted, the memory (e.g., memory 108, FIFO memory 512) contained within the electronic device, a communication protocol(s) associated with an electronic device, a compatible clock frequency(ies) associated with a host component (e.g., 102), a compatible clock frequency(ies) associated with the electronic device, etc.

In accordance with one aspect of the disclosed subject matter, the downlink clock frequency employed to facilitate transmitting data from the host component the electronic device can be determined such that it can be a higher frequency than an uplink clock frequency that can be employed to facilitate transmitting data from the electronic device to the host component. For example, during a program operation to program data to an electronic device, the host component can determine that the electronic device is a smart card. The data transfer component (e.g., 106) can facilitate dynamically selecting a downlink clock frequency that is compatible with the smart card, where the downlink clock frequency can be a higher frequency than the uplink clock frequency, which can be, for example, a clock frequency associated with a standard protocol.

At 904, data can be transmitted to the electronic device(s) (based in part on the determined downlink clock frequency. In accordance with one aspect of the disclosed subject matter, the data transfer component can employ a clock control component (e.g., 304) that can facilitate selecting the desired downlink clock frequency. The clock control component can then facilitate sending the associated control signals to dynamically select the desired downlink clock frequency to a clock switch (e.g., 302) that can effectuate the selection of the desired (e.g., determined) downlink clock frequency. The downlink frequency can then be presented to the electronic device(s) when data is being transmitted to the electronic device(s) to facilitate efficient transmission of data to the electronic device(s). By employing a faster clock frequency for the downlink data transfer, the data, which can be a large amount of data (e.g., operating system, applications, etc.), can be transmitted and/or programmed to the electronic device more quickly than if the data was transmitted and/or programmed to the electronic device based on the same frequency as the uplink clock frequency, which can be a slower clock frequency associated with a standard communication protocol, for example. At this point, methodology 900 can end.

Figure 10:
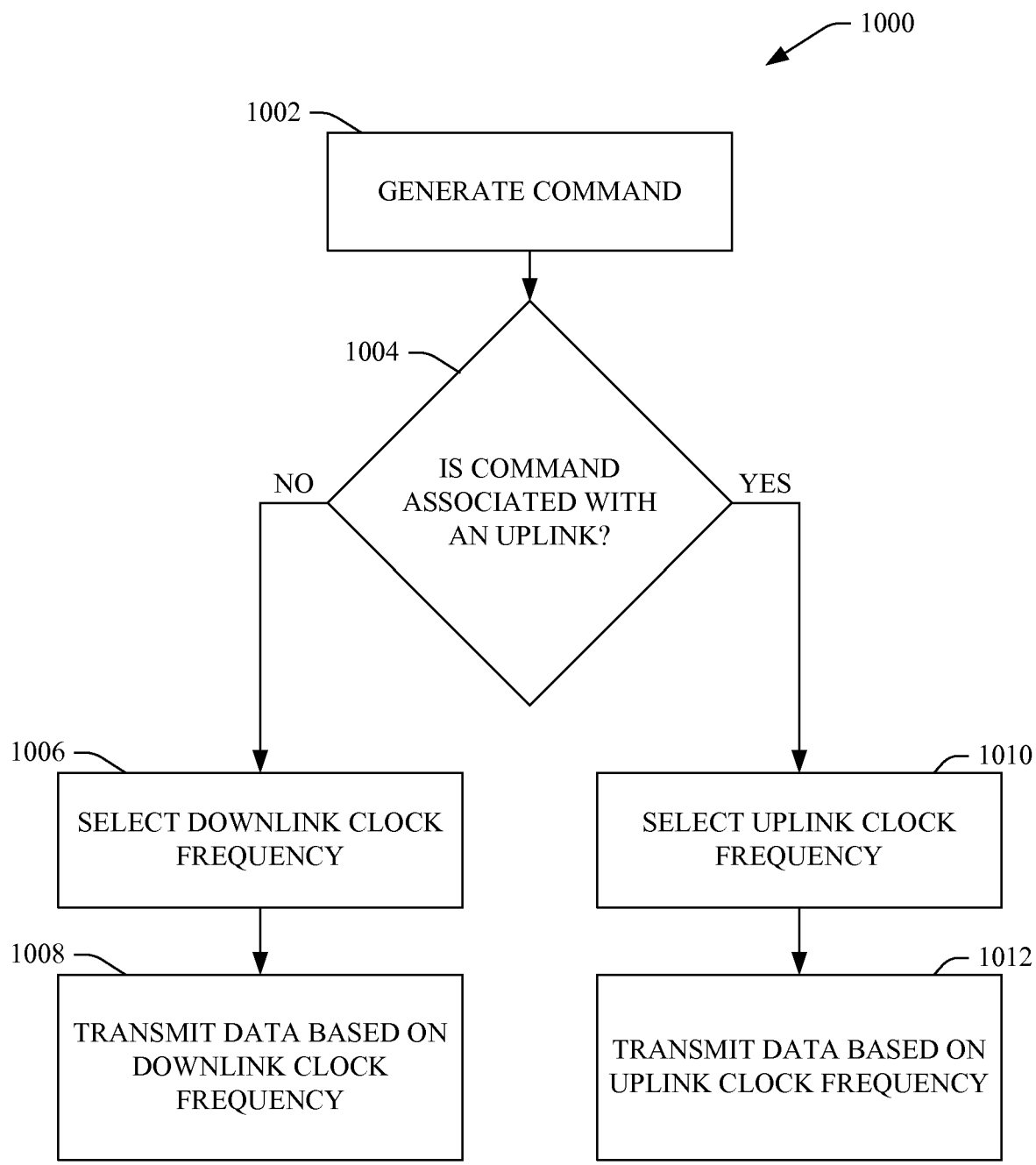
FIG. 10 depicts a methodology that facilitates transmitting data associated with an electronic device in accordance with an aspect of the disclosed subject matter

FIG. 10 depicts a methodology 1000 that can facilitate transmitting data associated with an electronic device in accordance with an aspect of the disclosed subject matter. At 1002, a command(s) can be generated. In accordance with an aspect, the command(s) can be generated by a processor (e.g., 202). In accordance with one aspect of the disclosed subject matter, after the data transfer component (e.g., 106) determines the transmit clock frequency and receive clock frequency, the data transfer component, which can include a processor, can generate commands to program the electronic device(s) with data such as, for example, programming for one or more operating systems (OS), audio files, video files, software applications, and/or personalized information based on predefined information from an end-user. The generated command(s) can be, for instance, a command to write data to, read data from, or erase data from an electronic device (e.g., 104).

At 1004, a determination can be made as to whether the generated command was a command to write data to the electronic device(s) (e.g., a downlink) or to read data from the electronic device(s) (e.g., an uplink). In accordance with one aspect of the disclosed subject matter, a command to write data to the electronic device(s) can be to write data such as, for example, an operating system that can be utilized with the electronic device, applications that can be utilized by the electronic device, audio and/or video files personal information associated with a user of the electronic device, etc. In accordance with another aspect of the disclosed subject matter, a command to read data from the electronic device can be to read data (e.g., personal information, such as bank account information, identification information, etc.) associated with a user of the electronic device, data that can facilitate identifying the type of electronic device and/or type of memory therein, data that can facilitate determining clock frequencies that can be employed to perform uplink data transmissions and/or downlink data transmissions, error correction codes (ECC) from the electronic device to facilitate the determination of whether any data errors were generated during previous data transfers of data to the electronic device(s), etc.

If it is determined that the generated command is a write command, then, at 1006, a downlink clock frequency can be selected. In accordance with one aspect, the data transfer component (e.g., 106) and/or the processor (e.g., 202) in coordination with the clock source module (e.g., 206) can select a higher clock frequency as the downlink clock frequency (as compared to the uplink clock frequency) to facilitate transferring the data to the electronic device(s). In accordance with an aspect, the downlink clock frequency can be dynamically determined and/or selected based in part on predefined criteria, such as more fully described herein, for example, with regard to methodology 900. At 1008, the data can be transmitted (e.g., programmed) based in part on the downlink clock frequency. For example, the data can be transmitted from the host component to the electronic device based in part on the downlink clock frequency, upon which the transmission rate can be based (at least in part), and the transmitted data can be programmed into the memory contained in the electronic device. By employing a higher clock frequency during a downlink transmission of data, data can be transmitted to the electronic device and/or programmed into the memory (e.g., 108) that can be contained therein at a faster rate than data transmitted from the electronic device to the host component, which can be advantageous, as, typically, larger amounts of data are programmed to certain electronic devices (e.g., smart card, cellular phone) than are transmitted from such electronic devices to other devices (e.g., host component).

Turning back to reference numeral 1004, if it is determined that the generated command was a read command, then, at 1010, an uplink clock frequency can be selected. In accordance with an aspect, the uplink clock frequency can be dynamically determined and/or selected based in part on predefined criteria, such as more fully described herein, for example, with regard to methodology 900. In one aspect, the data transfer component (e.g., 106) and/or the processor (e.g., 202) in coordination with the clock source module (e.g., 206) can select a lower clock frequency as the uplink clock frequency (as compared to the downlink clock frequency) to facilitate transferring the data from the electronic device(s).

The amount of read information (e.g., uplink data transmission) from the electronic device(s) can typically be orders of magnitude lower than that of the amount of data that can be written to the electronic device(s). For example, during a downlink, an OS can be transmitted to the electronic device(s) which can contain kilobits to megabits of information, for example. Conversely, for example, information, such as status or acknowledgment information that can typically be provided by an electronic device, such as a smart card, can often contain as little as several bytes down to one byte of information, for example. As the uplink information can potentially contain a relatively small amount of information, and due to the relatively limited die space available on the electronic device for additional circuitry for generating variable clock frequencies by the electronic device as well as the desire to have the electronic device be able to communicate in accordance with standard communication protocol(s), it can be desirable to maintain the uplink clock frequency at the conventional lower clock frequency.

Figure 11:
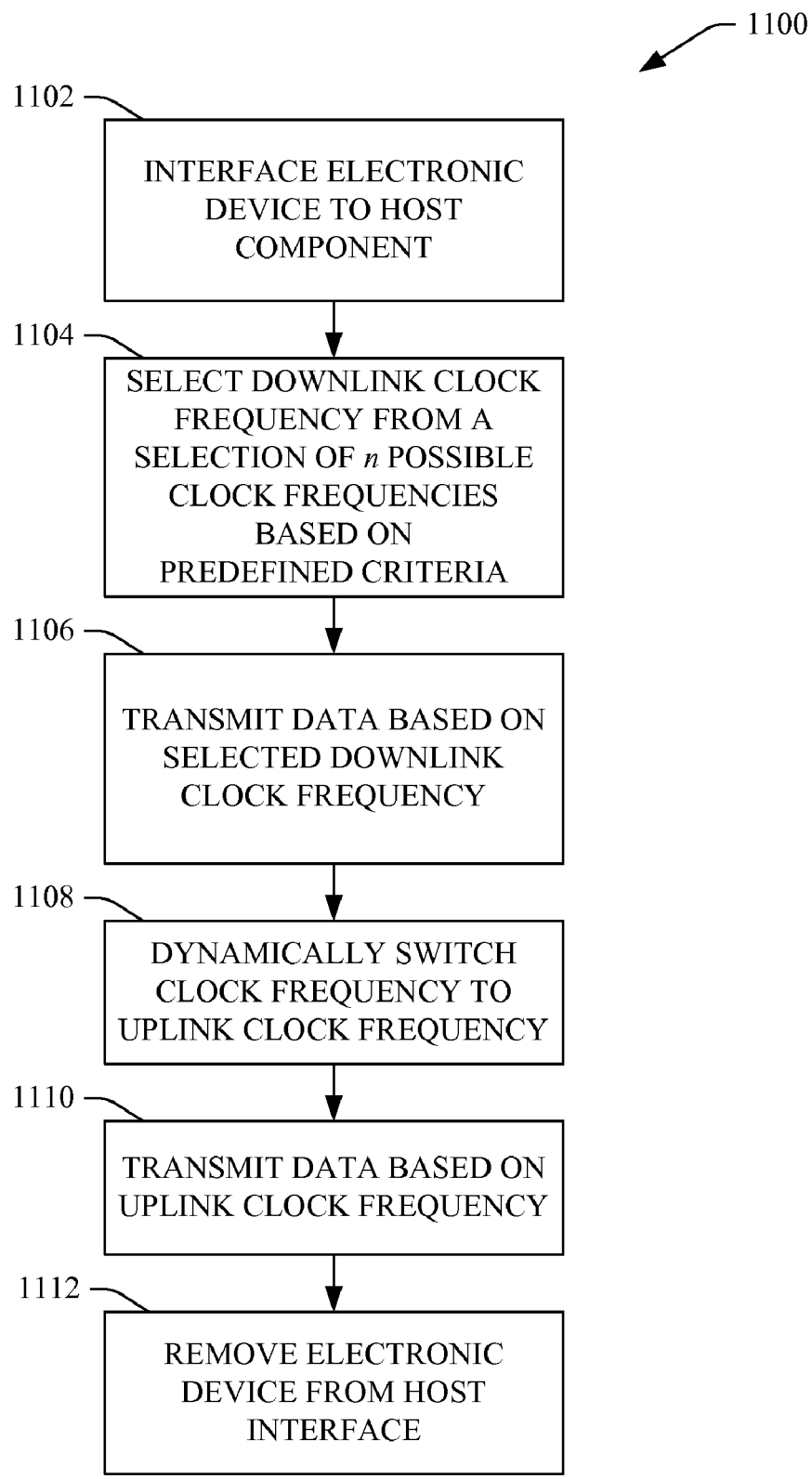
FIG. 11 depicts a methodology that facilitates determining a downlink clock to facilitate transmitting data associated with an electronic device in accordance with an aspect of the disclosed subject matter

Referring to FIG. 11, a methodology 1100 that can facilitate transmitting data associated with an electronic device in accordance with the disclosed subject matter is illustrated. At 1102, an interface to communicate data can be established. In one aspect, a host component (e.g., 102) can communicatively connect to an electronic device (e.g., 104), such as, for example, a smart card(s), a security card(s), a PDA(s), an electronic organizer(s), etc.

In accordance with one aspect of the disclosed subject matter, the host component can facilitate interfacing and/or communicatively connecting to the memory device(s) associated with the electronic device(s) i.e., prior to when the memory devices (e.g., integrated circuit(s) (ICs)) can be placed into the electronic device(s). In accordance with another aspect of the described subject matter, the host component can facilitate interfacing and communicatively connecting (e.g., electrical, wireless, infrared (IR), or any combination thereof) to the electronic device after the memory device has been installed into the electronic device. For example, the memory device can be installed into the electronic device (e.g., smart card, security card), and a card reader (e.g., the host component) can facilitate a connection with the electronic device to transmit and/or receive information (e.g., data) to/from the electronic device.

At 1104, a downlink clock frequency can be selected from a selection of n available clock frequencies based in part on predefined criteria, where n can be an integer. The predefined criteria can include such factors as described more fully herein, for example, with regard to methodology 900 and/or any other information that can be used to determine an optimum downlink clock frequency that can be utilized to transmit data from the host component to the electronic device. In accordance with one aspect of the disclosed subject matter, a processor (e.g., 202, for example) and/or data transfer component (e.g., 106) can facilitate the determination of a desired downlink clock frequency based in part on information that can be stored, for example, in system memory (e.g., system memory 204) pertaining to the electronic device(s), where such information can be type of electronic device(s), the protocol used with the electronic device(s), the amount of memory associated with the electronic devices, for instance. The processor can facilitate the relay of information associated with the electronic device to a data transfer component (e.g., 106), which can send the appropriate control signals to a clock source module (e.g., 206) to effectuate the selection of the desired downlink clock frequency (e.g., fastest compatible downlink clock frequency) to obtain the desired downlink speed.

In accordance with one aspect of the disclosed subject matter, the clock source module 206, for example, can facilitate the selection of the faster clock (e.g., clocks 402, 404, and 406) by programming the clock control component (e.g., 408) to select the clock signal from the clock$_1$ 402 during downlinks. In accordance with another aspect of the disclosed subject matter, the processor 202 can determine that the electronic device cannot support a fast downlink speed (as compared to the speed associated with a standard protocol) based in part on, for example, that the type of electronic device (e.g., brand, model, manufacture date, etc.). The data transfer component and/or the processor can facilitate the selection of a compatible clock speed by programming the clock control component (e.g., 408, 304) to select a clock signal from the n available clocks during downlink data transmissions, for example.

At 1106, the data can be transmitted and/or programmed into the electronic device(s), using the selected downlink clock frequency. At 1108, the clock frequency can be dynamically switched to an uplink clock frequency. For example, after the data has been transmitted and/or programmed to the electronic device, the data transfer component can facilitate dynamically switching from the downlink clock frequency to an uplink clock frequency. The uplink clock frequency can be based in part on a standard protocol, for example.

At 1110, data can be transmitted from the electronic device to the host component based in part on the uplink clock frequency. In one aspect, the host component 102 can facilitate the transmission of data from the electronic device to the host component by providing the clock signal (e.g., uplink clock frequency to the electronic device. For example, the processor 202, the data transfer component 106, and/or the system memory 204, can be preprogrammed to facilitate the selection of an uplink clock frequency (e.g., which can be a slower clock speed than that of the downlink clock frequency) to accomplish a predefined uplink speed.

At 1112, the electronic device(s) can be removed from the host component 102. At this point, methodology 1100 can end.

Figure 12:
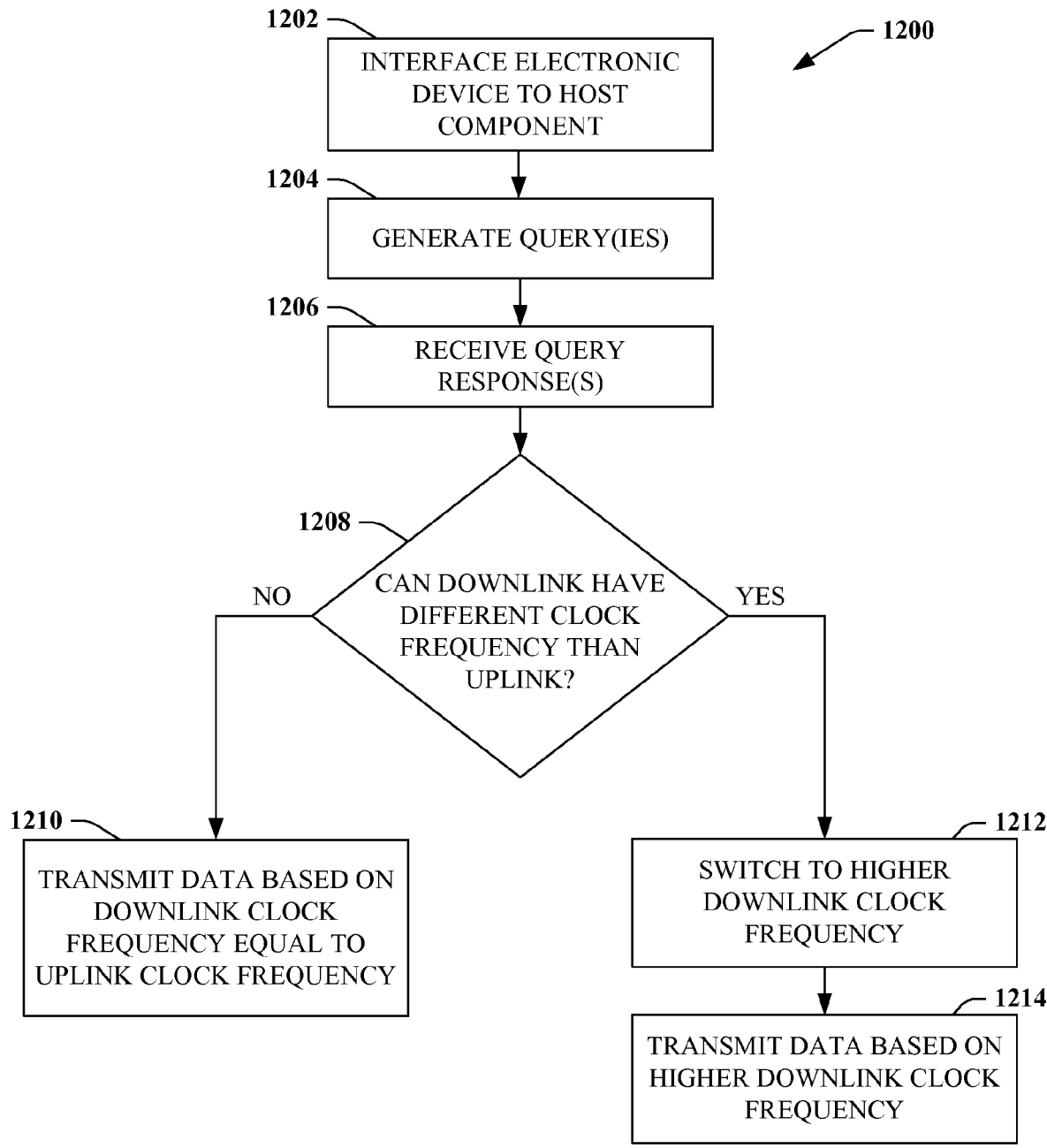
FIG. 12 illustrates a methodology that facilitates transmitting data associated with an electronic device in accordance with an aspect of the subject matter disclosed herein.

FIG. 12 depicts a methodology 1200 that can facilitate data communication associated with an electronic device in accordance with an aspect of the disclosed subject matter. At 1202, an interface or communication connection can be established. In one aspect, the host component 102 (e.g., a card reader) can interface with an electronic device (e.g., smart card, cellular phone) to communicatively connect (e.g., electrically wired, wireless, RFID, etc.) to the electronic device.

At 1204, one or more queries can be generated. In one aspect, the host component can facilitate generating queries that can be provided to the electronic device to learn information associated with the electronic device to facilitate determining an optimal downlink clock frequency (or optimal uplink clock frequency). At 1206, a query response(s) can be received. In one aspect, the host component (and/or data transfer component) can facilitate receiving and/or retrieving from the electronic device information associated with a clock frequency(ies) that can be used during the communication between the host component and the electronic device. In accordance with one aspect of the disclosed subject matter, the host component 102 can facilitate obtaining information related to the type of electronic device(s), the date of manufacture of the electronic device, a size of the buffer memory (e.g., FIFO memory 512), a communication protocol associated with the electronic device, and/or other data that can facilitate initialization of the communication and determination of an optimal downlink clock frequency. In accordance with an aspect of the disclosed subject matter, the data transfer component can determine an optimal downlink clock frequency based in part on the query responses received at 1206.

At 1208, a determination can be made as to whether a downlink clock frequency can be different from an uplink clock frequency. For example, the uplink clock frequency can be a clock frequency based on a standard protocol. To efficiently transmit and/or program to the electronic device, the data transfer component can determine whether a clock frequency that is higher than the uplink clock frequency can be utilized during a downlink transmission of data.

If it is determined that the downlink clock frequency cannot be different (e.g., higher frequency) from the uplink clock frequency, then, at 1210, the data can be transmitted at the same clock frequency as the uplink clock frequency. If, at 1208, it is determined that the downlink clock frequency can be different (e.g., higher frequency) than the uplink clock frequency, then, at 1212, the downlink clock frequency can be dynamically selected and/or switched to an optimal downlink clock frequency (e.g., fastest compatible clock frequency) that can be a higher frequency, and can thus result in a higher BAUD rate, than the uplink clock frequency. At 1214, the data can be transmitted at the optimal downlink clock frequency. For example, the data can be transmitted from the host component to the electronic device and/or programmed to the memory (e.g., 108) within the electronic device based in part on the downlink clock frequency. At this point, methodology 1200 can end.

Figure 13:
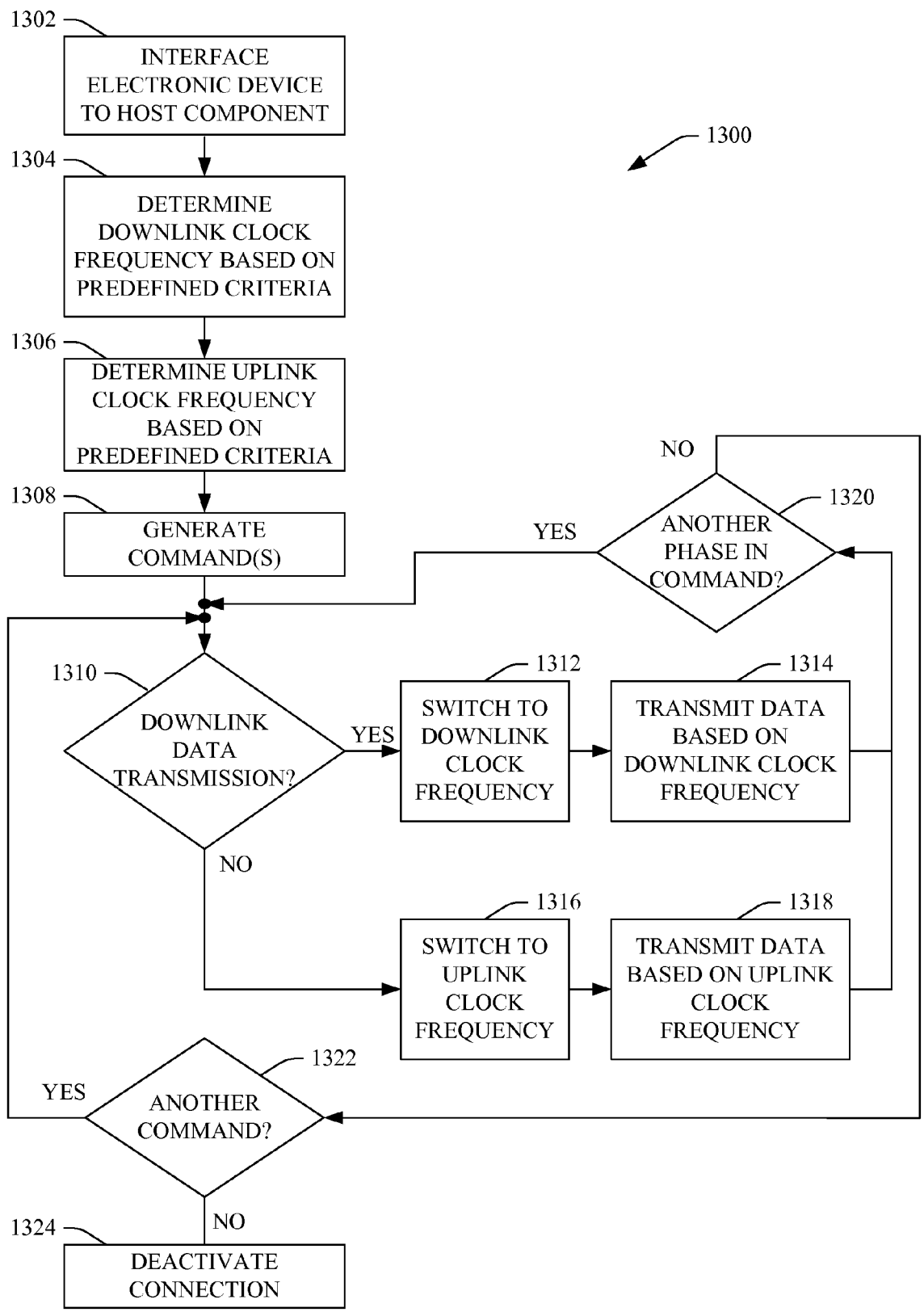
FIG. 13 depicts a methodology that facilitates transmitting data between an electronic device and a host component in accordance with an aspect of the disclosed subject matter.

Turning to FIG. 13, illustrated is a methodology 1300 that can facilitate transmitting data between a host component and an electronic device(s) in accordance with an aspect of the disclosed subject matter. At 1302, an interface or communication connection can be established. In one aspect, the host component (e.g., 102) can communicatively connect to an electronic device(s) (e.g., 104), such as, for example, a smart card, a security card, PDA, etc. In accordance with one aspect, the communication connected can be wired (e.g., wired electrical connection) or wireless (e.g., wireless network, RFID). At 1304, a downlink clock frequency (e.g., optimal downlink clock frequency) can be determined and/or selected based in part on a predefined criteria, such as the predefined criteria more fully described herein, for example, with regard to methodology 900.

In accordance with one aspect of the disclosed subject matter, a data transfer component (e.g., 106) can facilitate determining the desired downlink clock frequency by transmitting data to the electronic device(s) while incrementally increasing the clock frequency of the downlink clock frequency until the electronic device(s) and/or data protocol generates an error, for example. In accordance with another aspect of the disclosed subject matter, the host component (e.g., in association with all components therein) and/or a processor (e.g., 202) can facilitate communication with the electronic device(s) using virtually any number of protocols and can determine, based on the response, or lack thereof, from the electronic device(s), the most efficient protocol to use. The host component and/or the associated processor can then retain the information obtained from the electronic device(s) and use the information to quickly establish (e.g., more efficiently) the desired downlink clock frequency in subsequent data transfers with the same or similar types of electronic device(s).

At 1306, an uplink clock frequency (e.g., optimal downlink clock frequency) can be determined and/or selected based in part on a predefined criteria, such as the predefined criteria more fully described herein, for example, with regard to methodology 900. In accordance with one aspect of the disclosed subject matter, the desired uplink clock frequency can be lower than that of the downlink clock frequency. For example, legacy protocols (e.g., established protocols) associated with an electronic device (e.g., smart card) can dictate the maximum uplink clock frequency that can be utilized during uplink data transmissions, where the maximum uplink clock frequency can be different (e.g., lower frequency) than the downlink clock frequency. Further, for reasons of efficiency (e.g., cost, die space), it can be desirable to utilize an uplink clock frequency that can be lower than the downlink clock frequency.

At 1308, one or more commands can be generated. A command can be a program command to transfer and/or program data from the host component to the electronic device, a read command for the host component to read and/or receive data from the electronic device, and/or an erase command from the host component to erase data from the memory in the electronic device. A command can be made of one or several phases; each phase can involve either a downlink or an uplink data transmission. In one aspect, the command can be generated by a processor component (e.g., 202) and/or a data transfer component (e.g., 106) to facilitate transmission of data between a host component and an electronic device.

At 1310, a determination can be made as to whether the current processing phase of the command is associated with a downlink data transmission. If it is determined that the current phase of the command is associated with a downlink data transmission, then, at 1312, there can be a dynamic switch to and/or selection of a downlink clock frequency (e.g., optimal downlink clock frequency). In one aspect, the downlink clock frequency can be a higher frequency than the uplink clock frequency to optimize and/or make more efficient the transmitting and/or programming of data to the electronic device and/or that can be contained memory therein. At 1314, the data can be transmitted at a rate that can be based in part on the downlink clock frequency or the erase information can be transmitted and the erase performed based in part on the downlink clock frequency. In an aspect, the data can be transmitted from the host component to the electronic device at a rate that can be based in part on the downlink clock frequency. In another aspect, the data transmitted to the electronic device can be stored in a memory (e.g., flash memory) that can be contained therein. At this point, methodology 1300 can proceed to reference numeral 1320.

Turning back to reference numeral 1310, if it is determined that the current phase of the command is not associated with a downlink transmission, the current phase of the command can be an uplink transmission, and, at 1316, there can be a dynamic switch to and/or selection of an uplink clock frequency based in part on the predefined criteria. In one aspect, if the clock frequency is currently set at the downlink clock frequency, which can be a higher frequency than the uplink clock frequency, the data transfer component can dynamically switch from the downlink clock frequency to the desired uplink clock frequency. For example, the uplink clock frequency can be based in part on a communication protocol (e.g., ISO 7816-3 protocol) related to the electronic device (e.g., smart card).

At 1318, the data can be transmitted at a rate that can be based in part on the uplink clock frequency. In an aspect, the data can be transmitted from the electronic device to the host component at a rate that can be based in part on the uplink clock frequency. In another aspect, the data transmitted from the electronic device can be read and/or retrieved from the memory (e.g., flash memory) that can be contained therein. Methodology 1300 can then proceed to reference numeral 1320.

At 1320, a determination can be made regarding whether there is another phase associated with the command. If, at 1320, it is determined that there is another phase associated with the command, then methodology 1300 can return to reference numeral 1310, where methodology 1300 can proceed from that point. If, at 1320, it is determined that there is no other phase with regard to such command and therefore that processing is complete with regard to such command, then at 1322, a determination can be made whether there is another command to be executed. If, at 1322, it is determined that there is another command that can be executed, then methodology 1300 can return to reference numeral 1310, where methodology 1300 can proceed from that point. If, at 1322, it is determined that no other command is to be executed, then, at 1324, the communication connection can be deactivated or terminated. For example, if there is no command to be executed, the communication connection between the host component and the electronic device can be deactivated. At this point, methodology 1300 can end.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Clock switching as referred to herein can be physical clock switching by the host component (e.g., 102) or logical clock switching both by the host component and the electronic device (e.g., 104). In one aspect, in case of physical clock switching, the host component can facilitate the determination of a bus clock based in part on the determined downlink or uplink frequency. In another aspect, in case of logical clock switching, the host component can apply a fixed clock frequency on the clock line (e.g., the higher frequency downlink frequency) and both the electronic device and host component can internally switch to a lower frequency uplink frequency jointly determined and agreed to by the electronic device and host component when transmission from the electronic device to the host component occurs. For example, in accordance with an aspect, the uplink frequency can be computed as fraction of the downlink frequency (e.g., through a frequency divider).

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 14:
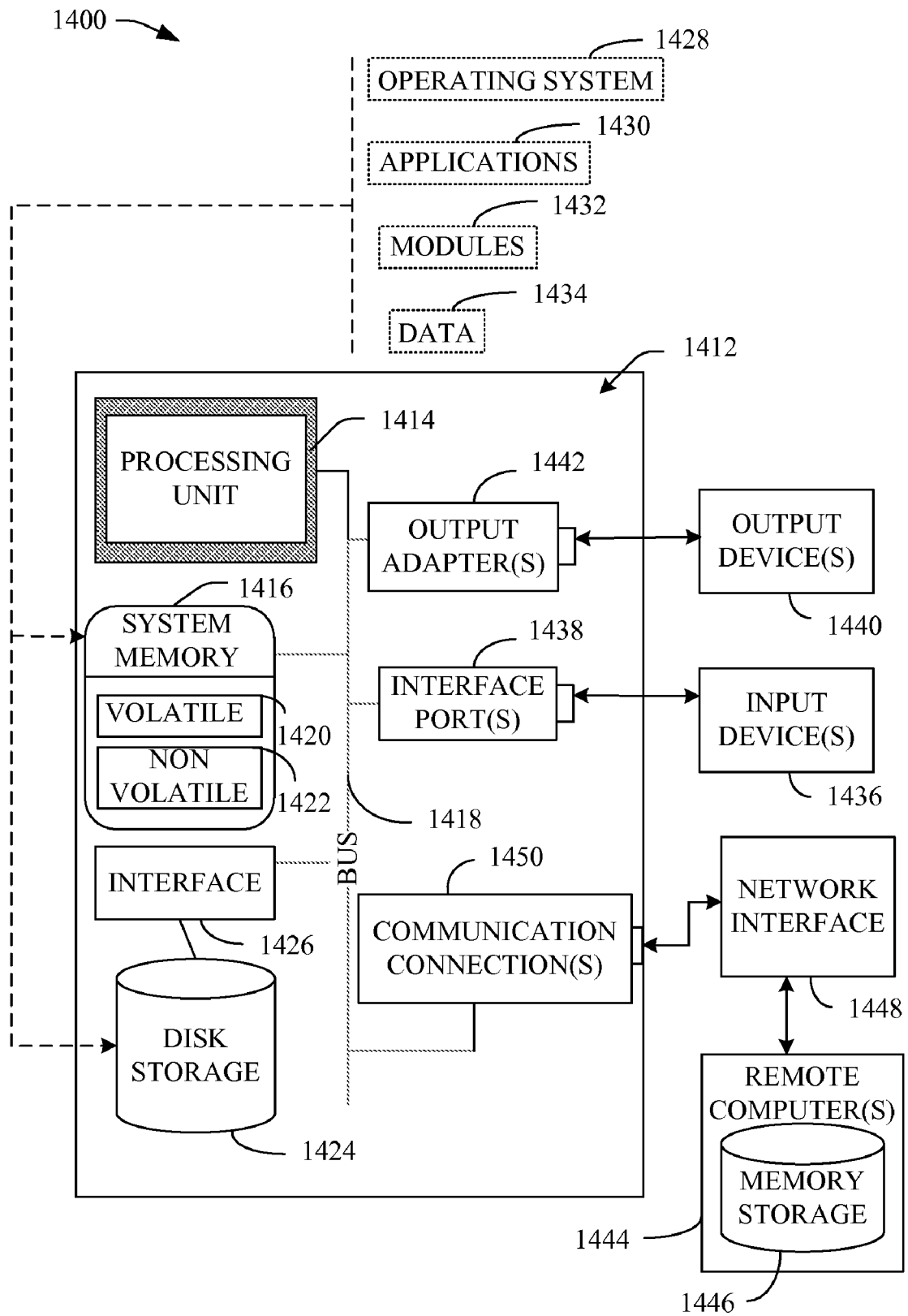
FIG. 14 is a schematic block diagram illustrating a suitable operating environment.
Figure 15:
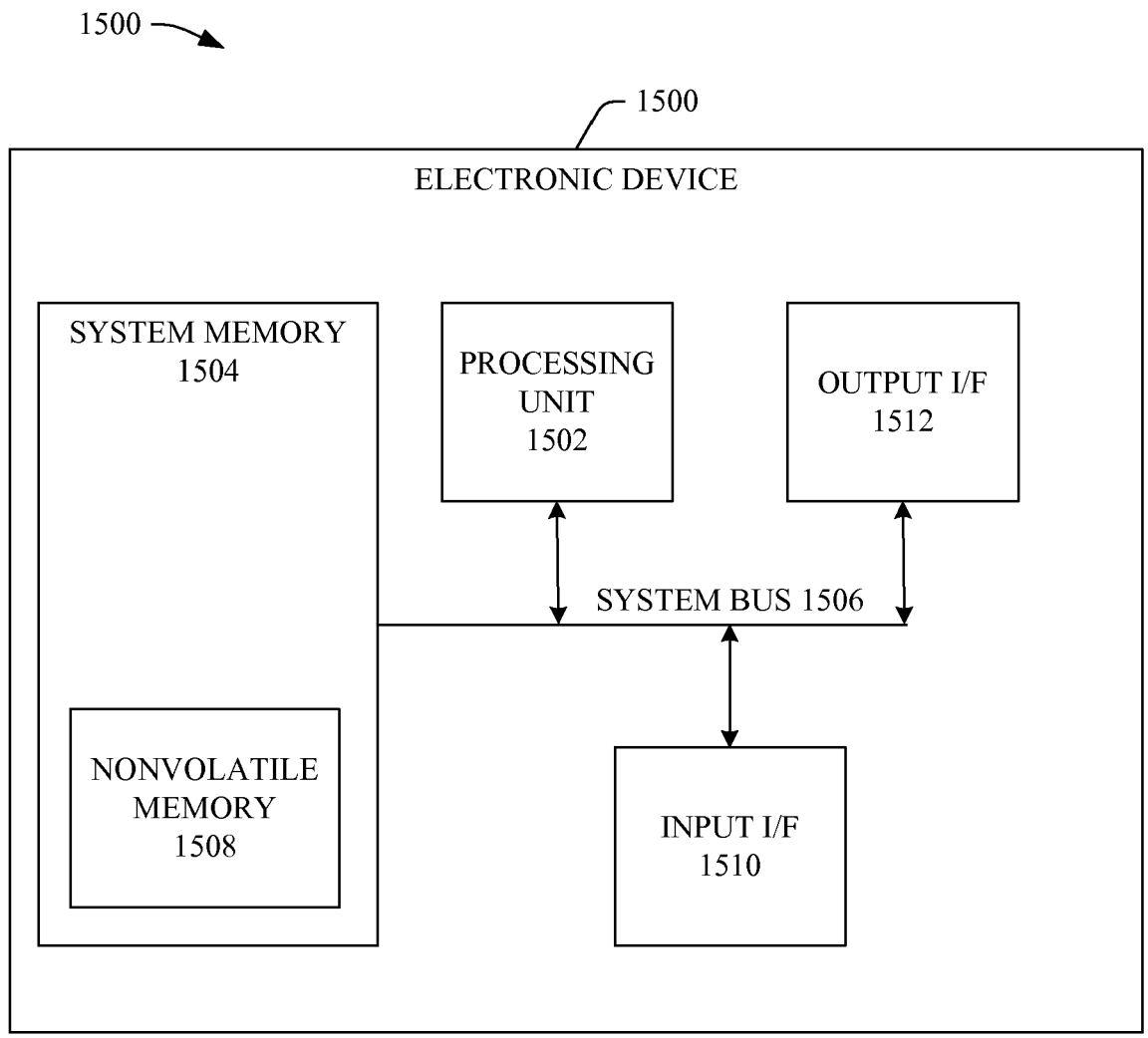
FIG. 15 is a block diagram of an exemplary electronic device that can employ a memory device(s).

In order to provide a context for the various aspects of the disclosed subject matter, FIGS. 14 and 15 as well as the following discussion are intended to provide a brief, general description of a suitable environment(s) in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 14, a suitable environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ES-DRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Referring to FIG. 15, illustrated is a block diagram of an exemplary, non-limiting electronic device 1500 that can incorporate system 100, system 200, system 300, system 400, system 500, system 600, and/or system 700, or a portion(s) thereof. The electronic device can include, but is not limited to, network equipment (e.g., routers, access points), a media player and/or recorder (e.g., audio player and/or recorder, video player and/or recorder), a television, a smart card, a phone, a cellular phone, a smart phone, an electronic organizer, a PDAs, a portable email reader, a laptop computers, a digital camera, an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system (e.g., global position satellite (GPS) system), secure memory devices with computational capabilities, devices with tamper-resistant chips, an embedded computer in a machine (e.g., an airplane, a copier, a motor vehicle, a microwave oven), and the like.

Components of the electronic device 1500 can include, but are not limited to, a processing unit 1502, a system memory 1504 (with nonvolatile memory 1508), and a system bus 1506 that can couple various system components including the system memory 1504 to the processing unit 1502. The system bus 1506 can be any of several types of bus structures including a memory bus or memory controller, a peripheral bus, or a local bus using any of a variety of bus architectures.

Electronic device 1500 can typically include a variety of computer readable media. Computer readable media can be any available media that can be accessed by the electronic device 1500. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1508 or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1500. Communication media typically embodies computer readable instructions, data structures, program modules or other data in a modulated data signal such as a carrier wave or other transport mechanism and includes any information delivery media.

The system memory 1504 includes computer storage media in the form of volatile and/or nonvolatile memory such as nonvolatile memory 1508. A basic input/output system (BIOS), containing the basic routines that help to transfer information between elements within electronic device 1500, such as during start-up, can be stored in memory 1504. System memory 1504 typically also contains data and/or program modules that can be immediately accessible to and/or presently being operated on by processing unit 1502. By way of example, and not limitation, system memory 1504 can also include an operating system, application programs, other program modules, and program data.

The nonvolatile memory 1508 can be removable or non-removable. For example, the nonvolatile memory 1508 can be in the form of a removable memory card (e.g., SD card, microSD card, SmartMedia) or a USB flash drive. It will be appreciated that nonvolatile memory 1508 can be an exemplary embodiment of the system memory 1504 that can be utilized by the illustrated electronic device 1500 and that other types of electrically erasable memory (e.g., EEPROM) can be utilized instead of or in addition to the nonvolatile memory 1508.

A user can enter commands and information into the electronic device 1500 through input devices (not shown) such as a keypad, microphone, tablet or touch screen although other input devices can also be utilized. These and other input devices can be connected to the processing unit 1502 through input interface 1510 that can be connected to the system bus 1506. Other interface and bus structures, such as a parallel port, game port or a universal serial bus (USB) can also be utilized. A graphics subsystem (not shown) can also be connected to the system bus 1506. A display device (not shown) can be also connected to the system bus 1506 via an interface, such as output interface 1512, which can in turn communicate with video memory. In addition to a display, the electronic device 1500 can also include other peripheral output devices such as speakers (not shown), which can be connected through output interface 1512.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates transmission of data associated with at least one electronic device, comprising:

the at least one electronic device that is configured to transmit and receive data; and a host component that is configured to transmit a query to the at least one electronic device to facilitate identification of available downlink clock frequencies and to dynamically select a downlink clock frequency from the available downlink clock frequencies and an uplink clock frequency to be supplied to the at least one electronic device based at least in part on information, which indicates available downlink clock frequencies, that is received from the at least one electronic device in response to the query and predetermined criteria to facilitate data transfers between the host component and the at least one electronic device, wherein the downlink clock frequency is a higher clock frequency than the uplink clock frequency to facilitate faster rate of transmission of data to the at least one electronic device than rate of transmission of data from the at least one electronic device to the host component.

2. The system of claim 1, wherein the information comprises at least one of a type of the at least one electronic device, a date of manufacture of the at least one electronic device, a size of memory buffer associated with the at least one electronic device, or a type of protocol associated with the at least one electronic device, and the predetermined criteria relates to at least one of a type of the at least one electronic device, a date of manufacture of the at least one electronic device, a size of memory buffer associated with the at least one electronic device, or a type of protocol associated with the at least one electronic device.

3. The system of claim 1, further comprising a memory that is configured to contain a plurality of memory locations in which data is stored, the memory is associated with the at least one electronic device, and the host component is configured to program data to the memory and receives data from the memory.

4. The system of claim 3, further comprising at least one memory buffer, the at least one electronic device is configured to contain the at least one memory buffer to facilitate data transfers to or from the memory.

5. The system of claim 3, wherein the memory is a non-volatile memory that is at least one of flash memory, mask-programmed read only memory, programmable read only memory, erasable programmable read only memory, ultra-violet-erase erasable programmable read only memory, one-time programmable read only memory, or electrically erasable programmable read only memory.

6. The system of claim 1, wherein the at least one electronic device is at least one of a smart card, a computer, a laptop computer, network equipment, a media player, a media recorder, a television, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system, a secure memory device with computational capabilities, a device with at least one tamper-resistant chip, an electronic device associated with industrial control systems, or an embedded computer in a machine, wherein the machine comprises one of an airplane, a copier, a motor vehicle, or a microwave oven.

7. The system of claim 1, wherein the host component is configured to select a same clock frequency for data to be transmitted to the at least one electronic device and for data to be transmitted from the at least one electrpnic device to the host component based at least in part on the predetermined criteria.

8. The system of claim 1, wherein the host component is configured to select a highest available downlink clock frequency from the available downlink clock frequencies as the downlink clock frequency based at least in part on the information received from the at least one electronic device in response to the query and the predetermined criteria.

9. The system of claim 1, wherein the host component and the at least one electronic device are configured to dynamically switch from the downlink clock frequency to the uplink clock frequency to facilitate transmission of data from the at least one electronic device to the host component.

10. The system of claim 1, wherein the at least one electronic device is a plurality of electronic devices, the host component is configured to transmit data to the plurality of electronic devices at substantially the same time.

11. The system of claim 1, wherein the host component is configured to be implemented by one or more computers.

12. The system of claim 1, further comprising:
a clock source module that is configured to provide a plurality of clock frequencies, wherein the clock source module is located within at least one of the host component or the electronic device; and
a clock control component that is configured to select one clock frequency of the plurality of clock frequencies to supply to the at least one electronic device during data transmits, the clock control component is configured to select a second clock frequency of said plurality of clock frequencies to be supplied to the electronic device during data receives, wherein the clock control component is located within at least one of the host component or the electronic device.

13. The system of claim 1, further comprising an intelligent component that is confiqured to infer at least one automated function to be performed by the host component.

14. The system of claim 1, wherein the host component is configured to interface with the at least one electronic device via at least one or a wired connection or a wireless connection.

15. A method that facilitates transmitting data associated with an electronic device, comprising:
transmitting a query to the electronic device to request information indicating available downlink clock frequencies;
selecting a downlink clock frequency from the available downlink clock frequencies and an uplink clock frequency based at least in part on the information received in response to the query and predefined criteria, the downlink clock frequency is associated with transmitting data to the electronic device, and the uplink clock frequency is associated with transmitting data from the electronic device, wherein the downlink clock frequency is a higher clock frequency than the uplink clock frequency to facilitate faster rate of transmission of data to the electronic device than rate of transmission of data from the electronic device to a host component; and
transmitting data to the electronic device at a rate based at least in part on the downlink clock frequency and transmitting data from the electronic device at a rate based at least in part on the uplink clock frequency.

16. The method of claim 15, wherein the selecting at least one of a downlink clock frequency or an uplink clock frequency based at least in part on a predefined criteria, the predefined criteria further comprising at least one of a type of the electronic device, a date of manufacture of the electronic device, a communication protocol associated the electronic device, or a size of a memory buffer associated with the electronic device.

17. The method of claim 15, further comprising:
generating at least one command, the command is at least one of a program, read, or erase; and
switching between the downlink clock frequency and the uplink clock frequency based at least in part on the command.

18. The method of claim 15, further comprising:
at least one of:
selecting the at least one of a downlink clock frequency or an uplink clock frequency from a plurality of clock sources based at least in part on a predefined criteria, or
dividing a clock frequency to obtain the at least one of a downlink clock frequency or an uplink clock frequency based at least in part on a predefined criteria.

19. A system for transmitting data associated with an electronic device, comprising:
means for transmitting a query to the electronic device to request information indicating available downlink clock frequencies;
means for determining a downlink clock frequency from the available downlink clock frequencies and an uplink clock frequency associated with transmitting data associated with the electronic device based at least in part on the information indicating the available downlink clock frequencies received in response to the query and predefined criteria, wherein the downlink clock frequency is a higher clock frequency than the uplink clock frequency; and
means for at least one of transmitting data to the electronic device or transmitting data from the electronic device based at least in part on the predefined criteria.

20. The system of claim 19, further comprising:
means for communicatively connecting a host component to the electronic device;
means for selecting the downlink clock frequency from the available downlink clock frequencies and the uplink clock frequency, wherein the downlink clock frequency is associated with transmitting data from the host component to the electronic device, the uplink clock frequency is associated with transmitting data from the electronic device to the host component;
means for dynamically switching between the downlink clock frequency and the uplink clock frequency; and
means for displaying data.

* * * * *